(12) United States Patent
Xu et al.

(10) Patent No.: US 10,791,053 B2
(45) Date of Patent: Sep. 29, 2020

(54) SERVICE FUNCTION CHAIN SFC-BASED COMMUNICATION METHOD, AND APPARATUS

(71) Applicant: Huawei Technologies Co., Ltd., Shenzhen (CN)

(72) Inventors: Ling Xu, Beijing (CN); Jie Dong, Beijing (CN); Guoyi Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/018,946

(22) Filed: Jun. 26, 2018

(65) Prior Publication Data

US 2018/0309675 A1 Oct. 25, 2018

Related U.S. Application Data

(63) Continuation of application No. PCT/CN2016/109751, filed on Dec. 13, 2016.

(30) Foreign Application Priority Data

Dec. 28, 2015 (CN) .......................... 2015 1 1004831

(51) Int. Cl.
*H04L 12/741* (2013.01)
*H04L 12/751* (2013.01)
(Continued)

(52) U.S. Cl.
CPC ............ *H04L 45/745* (2013.01); *H04L 12/18* (2013.01); *H04L 45/02* (2013.01); *H04L 45/12* (2013.01); *H04L 45/306* (2013.01); *H04L 45/38* (2013.01)

(58) Field of Classification Search
None
See application file for complete search history.

(56) References Cited

U.S. PATENT DOCUMENTS 8,654,769 B2    2/2014  Mentze et al.
9,042,234 B1 *  5/2015  Liljenstolpe ............ H04L 45/00
                                                        370/238
(Continued)

FOREIGN PATENT DOCUMENTS

CN    101588288 A    11/2009
CN    102546413 A    7/2012
(Continued)

OTHER PUBLICATIONS

Li et al., "Service Function Chaining (SFC) Control Plane Components and Requirements, draft-ietf-sfc-control-plane-01," Internet-Draft, pp. 1-27, Internet Engineering Task Force, Reston, Virginia, Nov. 25, 2015.

(Continued)

*Primary Examiner* — Kouroush Mohebbi
(74) *Attorney, Agent, or Firm* — Leydig, Voit & Mayer, Ltd.

(57) ABSTRACT

An SFC-based communications method and system, and an apparatus are provided. The SFC includes a CF node, an SFF node, and an SF node, and the SFF node is connected to the SF node. The method includes: receiving, by the CF node, a first message from the SFF node; obtaining, by the CF node, network topology information of the SFC based on the first message; obtaining, by the CF node, an SFC forwarding table, where the SFC forwarding table is determined based on the network topology information of the SFC; and sending, by the CF node to the SFF node, a second message (Continued)

used to indicate the SFC forwarding table. In this way, a network topology of the SFC can be flexibly and efficiently discovered.

30 Claims, 7 Drawing Sheets

(51) Int. Cl.
*H04L 12/725* (2013.01)
*H04L 12/18* (2006.01)
*H04L 12/721* (2013.01)

(56) References Cited

U.S. PATENT DOCUMENTS

| | | |
|---|---|---|
| 2015/0333930 A1 | 11/2015 | Aysola et al. |
| 2017/0012799 A1 | 1/2017 | Jiang et al. |
| 2017/0078175 A1 | 3/2017 | Xu et al. |

FOREIGN PATENT DOCUMENTS

| | | |
|---|---|---|
| CN | 103259670 A | 8/2013 |
| CN | 104639414 A | 5/2015 |
| CN | 104954274 A | 9/2015 |
| CN | 105141434 A | 12/2015 |

OTHER PUBLICATIONS

Halpern et al., "Service Function Chaining (SFC) Architecture," pp. 1-32, Internet Engineering Task Force, Reston, Virginia, Oct. 2015.
Li et al., "Service Function Chain control framework draft-ww-sfc-control-plane-01," XP015100032, pp. 1-11 (Jul. 2, 2014).

\* cited by examiner

SERVICE FUNCTION CHAIN SFC-BASED COMMUNICATION METHOD, AND APPARATUS

CROSS-REFERENCE TO RELATED APPLICATIONS

This application is a continuation of International Application No. PCT/CN2016/109751, filed on Dec. 13, 2016, which claims priority to Chinese Patent Application No. 201511004831.7, filed on Dec. 28, 2015. The disclosures of the aforementioned applications are hereby incorporated by reference in their entireties.

TECHNICAL FIELD

Embodiments of the present application relate to the communications field, and more specifically, to a service function chain SFC-based communication method and an apparatus.

BACKGROUND

A service function chain ("SFC") is a network technology for resolving an issue of inflexible deployment and adjustment of a network service device such as a firewall or a load balancer in a current network. A sequence of a group of devices (such as a firewall and a load balancer) that have a service processing function in a network is referred to as a service function chain SFC. The SFC may be considered as a virtual overlay network of a basic underlying network. A basic architecture of the SFC includes logical units shown in FIG. 1: a classifier ("CF") node 110, a service function forwarder ("SFF") node 120, and a service function ("SF") node 130. For example, the SF node is a device such as a firewall, a deep packet inspection device, or a load balancer.

In the SFC, a data packet is forwarded based on an SFC forwarding table. A network topology of the SFC needs to be learned of, to generate the SFC forwarding table. In other words, all nodes such as a CF node, an SFF node, and an SF node in an SFC network need to be discovered. In a current technology, the network topology of the SFC is discovered through manual configuration, and this manner has disadvantages of complexity and a lack of flexibility. For example, when an SF node in the SFC is deleted or moved, manual configuration needs to be performed again.

SUMMARY

Embodiments of the present application provide a service function chain SFC-based communication method and system, and an apparatus, so as to automatically discover a network topology of an SFC.

According to a first aspect, a service function chain SFC-based communication method is provided, where the SFC includes a classifier CF node, a service function forwarder SFF node, and a service function SF node, the SFF node is connected to the SF node, and the method includes:

receiving, by the CF node, a first message from the SFF node, where the first message includes identification information and attribute information of the SFF node, and identification information and attribute information of the SF node;

obtaining, by the CF node, network topology information of the SFC based on the first message, where the network topology information of the SFC includes the identification information and the attribute information of the SFF node, the identification information and the attribute information of the SF node, and information used to indicate a connection relationship between the SFF node and the SF node;

obtaining, by the CF node, an SFC forwarding table, where the SFC forwarding table is determined based on the network topology information of the SFC; and sending, by the CF node to the SFF node, a second message used to indicate the SFC forwarding table, so that the SFF node forwards a data packet based on the SFC forwarding table.

In the present application, the CF node in the SFC receives the first message from the SFF node in the SFC, and the first message includes the identification information and the attribute information of the SFF node, and the identification information and the attribute information of the SF node that has a connection relationship with the SFF node. Therefore, the CF node can obtain the network topology information of the SFC, that is, the CF node discovers a network topology of the SFC. Compared with the prior art in which the network topology of the SFC is discovered through manual configuration, in the method provided in the present application, the network topology of the SFC can be flexibly and efficiently discovered, and operation costs can also be reduced.

In addition, the method provided in the present application can be effectively applied to a case in which the network topology of the SFC changes. For example, when the SF node in the SFC is moved or deleted, the CF node can sense a change of the network topology of the SFC in a timely manner by using the method provided in the present application, so as to update the network topology information of the SFC in a timely manner.

Therefore, in the method provided in the present application, the network topology of the SFC can be flexibly and efficiently discovered, the SFC forwarding table generated based on the network topology of the SFC is then obtained, and the SFC forwarding table is sent to the SFF node in the SFC, so as to synchronize the SFC forwarding table.

With reference to the first aspect, in a first possible implementation of the first aspect, the receiving, by the CF node, a first message from the SFF node includes:

receiving, by the CF node, the first message from the SFF node in a multicast manner.

Specifically, both the CF node and the SFF node in the SFC join a particular multicast group, and a destination address of the first message sent by the SFF node is a multicast address of the particular multicast group. It should be understood that each member node in the particular multicast group can receive the first message whose destination address is the multicast address of the particular multicast group, that is, the CF node can receive the first message from the SFF node in a multicast manner, and therefore obtain the network topology information of the SFC. It should be understood that, in this implementation, each SFF node in the particular multicast group can also receive, in a multicast manner, a first message sent by another SFF node, and therefore can also obtain the network topology information of the SFC.

Therefore, compared with the prior art in which the network topology of the SFC is discovered through manual configuration, in the present application, the network topology of the SFC can be relatively flexibly and efficiently discovered.

With reference to the first aspect, in a second possible implementation of the first aspect, the receiving, by the CF node, a first message from the SFF node includes:

receiving, by the CF node, the first message from the SFF node in a flood manner.

With reference to any one of the first aspect, or the first and the second possible implementations of the first aspect, in a third possible implementation of the first aspect, a protocol used for the first message is the Intermediate System to Intermediate System IS-IS protocol or the Open Shortest Path First OSPF protocol, and the first message includes an SFF field used to indicate the identification information and the attribute information of the SFF node, and an SF field used to indicate the identification information and the attribute information of the SF node.

In the present application, communication between the SFF node and the CF node is implemented based on the IS-IS protocol or the OSPF protocol, so as to effectively discover the network topology of the SFC.

With reference to any one of the first aspect, or the first to the third possible implementations of the first aspect, in a fourth possible implementation of the first aspect, the sending, by the CF node to the SFF node, a second message used to indicate the SFC forwarding table includes:

sending, by the CF node, the second message to the SFF node in a multicast manner.

Specifically, for example, both the CF node and the SFF node in the SFC join a particular multicast group, and a destination address of the second message that is sent by the CF node and that is used to indicate the SFC forwarding table is a multicast address of the particular multicast group. It should be understood that each member node in the particular multicast group can receive the second message whose destination address is the multicast address of the particular multicast group. Therefore, each SFF node in the SFC can receive the second message, so that the SFC forwarding table is synchronized. Therefore, compared with the prior art in which each node in the SFC needs to support the southbound interface protocol when the SFC forwarding table is delivered to the node in the SFC by using the southbound interface protocol, in the method in the present application, operability of synchronizing the SFC forwarding table can be effectively improved, and efficiency of synchronizing the SFC forwarding table can also be improved.

With reference to any one of the first aspect, or the first to the third possible implementations of the first aspect, in a fifth possible implementation of the first aspect, the sending, by the CF node to the SFF node, a second message used to indicate the SFC forwarding table includes:

sending, by the CF node, the second message to the SFF node in a flood manner.

Specifically, the CF node only needs to send the second message to a neighboring node of the CF node, and the second message is forwarded to each SFF node in the SFC hop by hop in a flood manner. Therefore, compared with the prior art in which each node in the SFC needs to support the southbound interface protocol when the SFC forwarding table is delivered to the node in the SFC by using the southbound interface protocol, in the method in the present application, operability of synchronizing the SFC forwarding table can be effectively improved, and efficiency of synchronizing the SFC forwarding table can also be improved.

With reference to any one of the first aspect or the foregoing possible implementations of the first aspect, in a sixth possible implementation of the first aspect, an entry of the SFC forwarding table includes indication information used to indicate a service function path, and the indication information includes the identification information of the SFF node and at least one of the identification information and the attribute information of the SF node.

With reference to the sixth possible implementation of the first aspect, in a seventh possible implementation of the first aspect, a protocol used for the second message is the IS-IS protocol or the OSPF protocol.

Specifically, the second message includes an SF field used to indicate at least one of the identification information and the attribute information of the SF node, and an SFF field used to indicate the identification information of the SFF node.

Therefore, in the method in the present application, the SFC forwarding table can be synchronized by using the relatively general IS-IS protocol or OSPF protocol. Compared with the prior art in which each node in the SFC needs to support the southbound interface protocol when the SFC forwarding table is delivered to the node in the SFC by using the southbound interface protocol, in the method in the present application, operability of synchronizing the SFC forwarding table can be effectively improved.

With reference to any one of the first aspect or the foregoing possible implementations of the first aspect, in an eighth possible implementation of the first aspect, the communication method further includes:

sending, by the CF node in a multicast manner or a flood manner, a third message including identification information and attribute information of the CF node to the SFF node, where a protocol used for the third message is the IS-IS protocol or the OSPF protocol, and the third message includes a CF field used to indicate the identification information and the attribute information of the CF node.

It should be understood that the SFF node can identify a function and a role of the CF node based on the third message, so as to help subsequently effectively receive the SFC forwarding table sent by the CF node.

According to a second aspect, a service function chain SFC-based communication method is provided, where the SFC includes a classifier CF node, a service function forwarder SFF node, and a service function SF node, the SFF node is connected to the SF node, and the method includes:

obtaining, by the CF node, network topology information of the SFC, where the network topology information of the SFC includes identification information and attribute information of the SFF node, identification information and attribute information of the SF node, and information used to indicate a connection relationship between the SFF node and the SF node;

obtaining, by the CF node, an SFC forwarding table, where the SFC forwarding table is determined based on the network topology information of the SFC; and sending, by the CF node to the SFF node in a flood manner or a multicast manner, a second message used to indicate the SFC forwarding table, so that the SFF node forwards a data packet based on the SFC forwarding table.

It should be understood that, in the present application, the CF node only needs to send the second message to a neighboring node of the CF node, and the second message is forwarded to each SFF node hop by hop in a flood manner or a multicast manner. Compared with the prior art in which each node in the SFC needs to support the southbound interface protocol when the SFC forwarding table is delivered to the node in the SFC by using the southbound interface protocol, in the method in the present application, operability of synchronizing the SFC forwarding table can be effectively improved, and efficiency of synchronizing the SFC forwarding table can also be improved.

With reference to the second aspect, in a first possible implementation of the second aspect, an entry of the SFC forwarding table includes indication information used to indicate a service function path, and the indication information includes the identification information of the SFF node and at least one of the identification information and the attribute information of the SF node.

With reference to the second aspect or the first possible implementation of the second aspect, in a second possible implementation of the second aspect, a protocol used for the second message is the IS-IS protocol or the OSPF protocol.

Therefore, in the method in the present application, the SFC forwarding table can be synchronized by using the relatively general IS-IS protocol or OSPF protocol. Compared with the prior art in which each node in the SFC needs to support the southbound interface protocol when the SFC forwarding table is delivered to the node in the SFC by using the southbound interface protocol, in the method in the present application, operability of synchronizing the SFC forwarding table can be effectively improved.

In the foregoing implementations, the SFF node represents each SFF node in the service function chain SFC. To be specific, the CF node receives a first message sent by each SFF node in the SFC, and also sends, to each SFF node, the second message used to indicate the SFC forwarding table. It should be understood that, the SFC may include one or more SFF nodes, each SFF node may be connected to one or more SF nodes, and SF nodes connected to different SFF nodes may be different or the same. In the present application, each SFF node in the SFC sends the first message to the CF node, and the first message includes identification information and attribute information of the SFF node, and identification information and attribute information of an SF node that has a connection relationship with the SFF node. For example, when the SFC includes a first SFF node, a second SFF node, and a third SFF node, the three SFF nodes separately send first messages to the CF node, where the first SFF node is connected to a first SF node (the first SF node may include one or more SF nodes), the second SFF node is connected to a second SF node, and the third SFF node is connected to a third SF node. The first message sent by the first SFF node includes identification information and attribute information of the first SFF node, and identification information and attribute information of the first SF node. The first message sent by the second SFF node includes identification information and attribute information of the second SFF node, and identification information and attribute information of the second SF node. The first message sent by the third SFF node includes identification information and attribute information of the third SFF node, and identification information and attribute information of the third SF node. It should be further understood that, the CF node can obtain the network topology information of the SFC by separately receiving the first messages sent by the first SFF node, the second SFF node, and the third SFF node. The CF node sends the SFC forwarding table to the first SFF node, the second SFF node, and the third SFF node, to synchronize the SFC forwarding table.

According to a third aspect, a service function chain SFC-based communication method is provided, where the SFC includes a classifier CF node, a first service function forwarder SFF node, and a first service function SF node, the first SFF node is connected to the first SF node, and the method includes:

sending, by the first SFF node, a first message to the CF node, where the first message includes identification information and attribute information of the first SFF node, and identification information and attribute information of the first SF node, so that the CF node obtains network topology information of the SFC based on the first message, where the network topology information of the SFC includes identification information and the attribute information of the first SFF node, the identification information and the attribute information of the first SF node, and information used to indicate a connection relationship between the first SFF node and the first SF node;

receiving, by the first SFF node from the CF node, a second message used to indicate an SFC forwarding table, where the SFC forwarding table is determined based on the network topology information of the SFC; and forwarding, by the first SFF node, a data packet based on the SFC forwarding table.

In the present application, the SFF node in the SFC sends the first message to the CF node, and the first message includes the identification information and the attribute information of the SFF node, and the identification information and the attribute information of the SF node that has a connection relationship with the SFF node. Therefore, the CF node can obtain the network topology information of the SFC, that is, the CF node discovers a network topology of the SFC. Compared with the prior art in which the network topology of the SFC is discovered through manual configuration, in the method provided in the present application, the network topology of the SFC can be flexibly and efficiently discovered, and operation costs can also be reduced.

In addition, the method provided in the present application can be effectively applied to a case in which the network topology of the SFC changes. For example, when the SF node in the SFC is moved or deleted, the CF node can sense a change of the network topology of the SFC in a timely manner by using the method provided in the present application, so as to update the network topology information of the SFC in a timely manner.

Therefore, in the method provided in the present application, the network topology of the SFC can be flexibly and efficiently discovered, the SFC forwarding table generated based on the network topology of the SFC is then obtained, and the SFC forwarding table is sent to the SFF node in the SFC, so as to synchronize the SFC forwarding table.

With reference to the third aspect, in a first possible implementation of the third aspect, the sending, by the first SFF node, a first message to the CF node includes:

sending, by the first SFF node, the first message to the CF node in a multicast manner.

Specifically, both the CF node and the SFF node in the SFC join a particular multicast group, and a destination address of the first message sent by the SFF node is a multicast address of the particular multicast group. It should be understood that each member node in the particular multicast group can receive the first message whose destination address is the multicast address of the particular multicast group, that is, the CF node can receive the first message from the SFF node in a multicast manner, and therefore obtain the network topology information of the SFC. It should be understood that, in this implementation, each SFF node in the particular multicast group can also receive, in a multicast manner, a first message sent by another SFF node, and therefore can also obtain the network topology information of the SFC.

Therefore, compared with the prior art in which the network topology of the SFC is discovered through manual configuration, in the present application, the network topology of the SFC can be relatively flexibly and efficiently discovered.

With reference to the third aspect, in a second possible implementation of the third aspect, the sending, by the first SFF node, a first message to the CF node includes:

sending, by the first SFF node, the first message to the CF node in a flood manner.

With reference to any one of the third aspect, or the first and the second possible implementations of the third aspect, in a third possible implementation of the third aspect, a protocol used for the first message is the Intermediate System to Intermediate System IS-IS protocol or the Open Shortest Path First OSPF protocol, and the first message includes an SFF field used to indicate the identification information and the attribute information of the first SFF node, and an SF field used to indicate the identification information and the attribute information of the first SF node.

In the present application, communication between the SFF node and the CF node is implemented based on the IS-IS protocol or the OSPF protocol, so as to effectively discover the network topology of the SFC.

With reference to any one of the third aspect, or the first to the third possible implementations of the third aspect, in a fourth possible implementation of the third aspect, the receiving, by the first SFF node from the CF node, a second message used to indicate an SFC forwarding table includes:

receiving, by the first SFF node, the second message from the CF node in a multicast manner.

With reference to any one of the third aspect, or the first to the third possible implementations of the third aspect, in a fifth possible implementation of the third aspect, the receiving, by the first SFF node from the CF node, a second message used to indicate an SFC forwarding table includes:

receiving, by the first SFF node, the second message from the CF node in a flood manner.

With reference to any one of the third aspect or the foregoing possible implementations of the third aspect, in a sixth possible implementation of the third aspect, an entry of the SFC forwarding table includes indication information used to indicate a service function path, and the indication information includes the identification information of the first SFF node and at least one of the identification information and the attribute information of the first SF node.

With reference to the sixth possible implementation of the third aspect, in a seventh possible implementation of the third aspect, a protocol used for the second message is the IS-IS protocol or the OSPF protocol.

With reference to any one of the third aspect or the foregoing possible implementations of the third aspect, in an eighth possible implementation of the third aspect, the communication method further includes:

receiving, by the first SFF node in a multicast manner or a flood manner, a third message including identification information and attribute information of the CF node from the CF node, where a protocol used for the third message is the IS-IS protocol or the OSPF protocol, and the third message includes a CF field used to indicate the identification information and the attribute information of the CF node.

It should be understood that the SFF node can identify a function and a role of the CF node based on the third message, so as to help subsequently effectively receive the SFC forwarding table sent by the CF node.

With reference to any one of the third aspect or the foregoing possible implementations of the third aspect, in a ninth possible implementation of the third aspect, the communication method further includes:

receiving, by the first SFF node, a fourth message from a second SFF node in the SFC in a flood manner or a multicast manner, where the fourth message includes identification information and attribute information of the second SFF node, and identification information and attribute information of a second SF node that has a connection relationship with the second SFF node, and the first SFF node and the second SFF node are different SFF nodes;

obtaining, by the first SFF node, the network topology information of the SFC based on the fourth message; and sending, by the first SFF node, the first message to the second SFF node in a flood manner or a multicast manner, so that the second SFF node obtains the network topology information of the SFC based on the first message.

A protocol used for each of the fourth message and the first message is the IS-IS protocol or the OSPF protocol. The fourth message includes an SFF field used to indicate the identification information and the attribute information of the second SFF node, and an SF field used to indicate the identification information and the attribute information of the second SF node. The first message includes the SFF field used to indicate the identification information and the attribute information of the first SFF node, and the SF field used to indicate the identification information and the attribute information of the first SF node.

In the ninth possible implementation of the third aspect, the SFC includes at least two SFF nodes, and the first SFF node and the second SFF node represent any two SFF nodes in the SFC. For example, the SFC includes three SFF nodes, the first SFF node may represent any SFF node in the three SFF nodes, and the second SFF node may represent any SFF node other than the SFF node in the three SFF nodes. It should be understood that, each of the three SFF nodes sends the first message to the CF node, and the three SFF nodes send, to each other, messages including identification information and attribute information related to the three SFF nodes. It should be understood that the fourth message may be a message in a same format as the first message.

Specifically, for example, the CF node in the SFC and each SFF node in the SFC all join a particular multicast group, and each member node in the particular multicast group can receive a first message that is sent by another member node and whose destination address is a multicast address of the particular multicast group. Therefore, the CF node and each SFF node in the SFC all can obtain the network topology information of the SFC based on the received first message. When a service function path in the SFC forwarding table is a loose path such as Type 1 SF-Type 2 SF-Type 3 SF, the CF node and the SFF node can dynamically compute a next-hop node based on the locally obtained network topology information of the SFC. Therefore, in the method provided in the present application, it can be effectively ensured that the SFC effectively forwards a data packet on a forwarding plane.

In the third aspect and the implementations of the third aspect, the first SFF node and the second SFF node are intended to identify the two SFF nodes as different SFF nodes in the SFC, but are not intended to limit solutions of the present application. The first SFF node represents each SFF node in the SFC.

According to a fourth aspect, a CF node in a service function chain SFC is provided, where the CF node is configured to perform the method according to any one of the first aspect or the possible implementations of the first aspect.

Specifically, the CF node may include a module configured to perform the method according to any one of the first aspect or the possible implementations of the first aspect.

According to a fifth aspect, a CF node in a service function chain SFC is provided, where the CF node is configured to perform the method according to any one of the second aspect or the possible implementations of the second aspect.

Specifically, the CF node may include a module configured to perform the method according to any one of the second aspect or the possible implementations of the second aspect.

According to a sixth aspect, a first SFF node in a service function chain SFC is provided, where the first SFF node is configured to perform the method according to any one of the third aspect or the possible implementations of the third aspect.

Specifically, the first SFF node may include a module configured to perform the method according to any one of the third aspect or the possible implementations of the third aspect.

According to a seventh aspect, a service function chain SFC-based system is provided, where the system includes the CF node provided in the fourth aspect and the first SFF node provided in the sixth aspect.

According to an eighth aspect, a CF node in a service function chain SFC is provided, where the CF node includes a memory and a processor, the memory is configured to store an instruction, and the processor is configured to execute the instruction stored in the memory, so that the processor performs the method according to any one of the first aspect or the possible implementations of the first aspect.

According to a ninth aspect, a CF node in a service function chain SFC is provided, where the CF node includes a memory and a processor, the memory is configured to store an instruction, and the processor is configured to execute the instruction stored in the memory, so that the processor performs the method according to any one of the second aspect or the possible implementations of the second aspect.

According to a tenth aspect, an SFF node in a service function chain SFC is provided, where the SFF node includes a memory and a processor, the memory is configured to store an instruction, and the processor is configured to execute the instruction stored in the memory, so that the processor performs the method according to any one of the third aspect or the possible implementations of the third aspect.

In some of the foregoing implementations, the identification information of the SFF node represents information that can uniquely indicate the SFF node. For example, the identification information of the SFF node is an IP address or a MAC address of the SFF node. Likewise, the identification information of the SF node is, for example, an IP address or a MAC address of the SF node, and the identification information of the CF node is, for example, an IP address or a MAC address of the CF node.

In some of the foregoing implementations, the attribute information of the SFF node is information that can reflect a capability or an attribute of the SFF node. Specifically, for example, the attribute information of the SFF node includes role information of the SFF node, and the role information of the SFF node is used to indicate that the SFF node is a node with a service forwarding function. It should be understood that the role information of the SFF node indicates that the SFF node is different from the SF node or the CF node. Likewise, the attribute information of the CF node is information that can reflect a capability or an attribute of the CF node. Specifically, for example, the attribute information of the CF node includes role information of the CF node, and the role information of the CF node is used to indicate that the CF node is a node with a service classification function. It should be understood that the role information of the CF node indicates that the CF node is different from the SFF node or the SF node. Likewise, the attribute information of the SF node is information that can reflect a capability or an attribute of the SF node. Specifically, for example, the attribute information of the SF node includes role information of the SF node, and the role information of the SF node is used to indicate that the SF node is a node with a service function. Specifically, the SF node may be an apparatus that has any of the following functions: a firewall, load balancing, a gateway, deep packet inspection, anti-attack, quality of service ("QoS"), and the like. It should be understood that the role information of the SF node indicates that the SF node is different from the SFF node or the CF node.

In some of the foregoing implementations, that the CF node obtains the SFC forwarding table includes:

When the CF node is a control node of the SFC, the CF node generates the SFC forwarding table based on the obtained network topology information of the SFC.

Alternatively, when the CF node is not a control node of the SFC, the CF node reports the obtained network topology information of the SFC to a control node, the control node generates the SFC forwarding table based on the network topology information of the SFC, and the CF node obtains the SFC forwarding table from the control node.

In some of the foregoing implementations, when a protocol used for the first message, the second message, the third message, or the fourth message is the IS-IS protocol, an encapsulation format of the first message, the second message, the third message, or the fourth message is shown in FIG. 5. An IS-IS packet is sequentially encapsulated by using a data link layer header (L2 header) 1, a generic routing encapsulation ("GRE") header, an IP header, and a data link layer header (L2 header) 2. It should be noted that, when both the CF node and the SFF node join a particular multicast group, the L2 header 2 and the IP header shown in FIG. 5 are respectively a MAC address and an IP address of the particular multicast group.

In some of the foregoing implementations, when a protocol used for the first message, the second message, the third message, or the fourth message is the Open Shortest Path First ("OSPF") protocol, an encapsulation format of the first message, the second message, the third message, or the fourth message is shown in FIG. 6. An OSPF packet is sequentially encapsulated by using an IP header 1, a GRE header, an IP header 2, and a data link layer header (L2 header). It should be noted that, when the CF node and each SFF node in the SFC all join a particular multicast group, the L2 header and the IP header 2 shown in FIG. 6 are respectively a MAC address and an IP address of the particular multicast group.

Based on the foregoing technical solutions, the CF node in the SFC receives the first message from the SFF node in the SFC, and the first message includes the identification information and the attribute information of the SFF node, and the identification information and the attribute information of the SF node that has a connection relationship with the SFF node. Therefore, the CF node can obtain the network topology information of the SFC, that is, the CF node discovers the network topology of the SFC. Compared with the prior art in which the network topology of the SFC is discovered through manual configuration, in the method provided in the present application, the network topology of the SFC can be flexibly and efficiently discovered, and operation costs can also be reduced.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

To facilitate understanding and description of a service function chain SFC-based communication method and an apparatus that are provided in the embodiments of the present application, an application scenario of the embodiments of the present application is first described with reference to FIG. 1.

Figure 1:
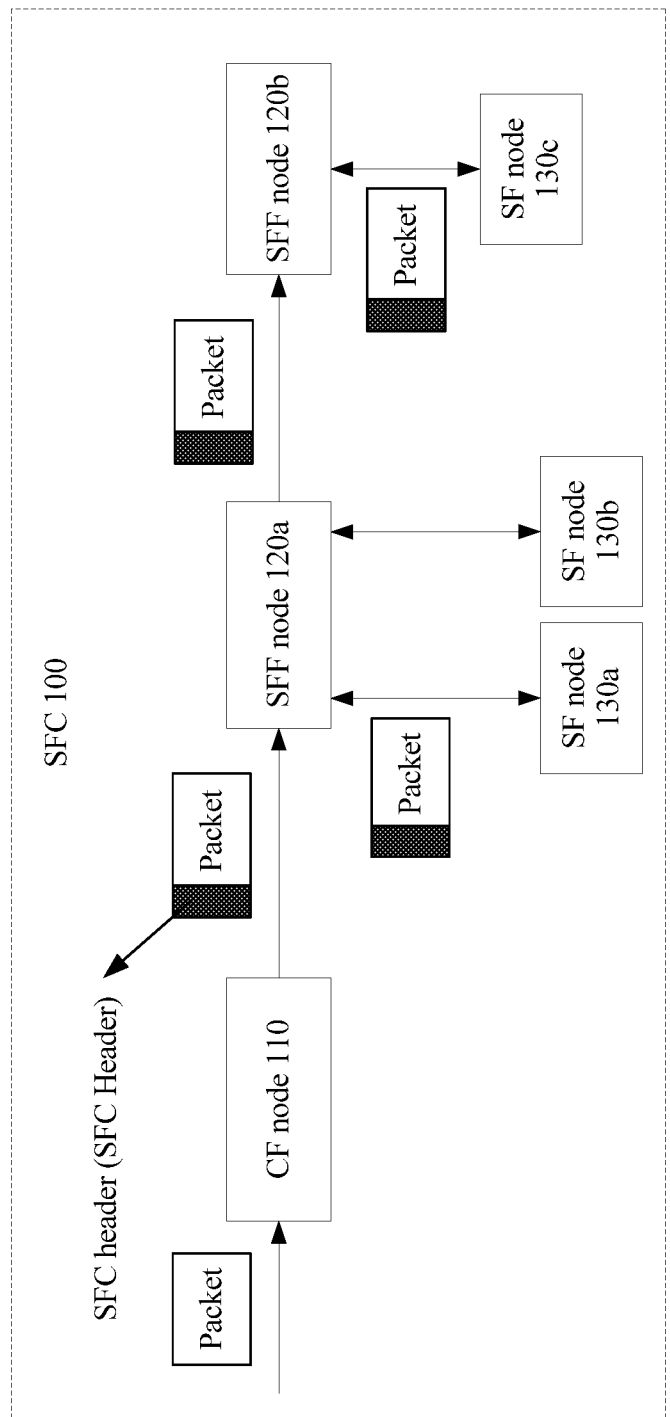
FIG. 1 is a schematic diagram of an application scenario of an embodiment of the present application.

As shown in FIG. 1, a service function chain ("SFC") 100 includes a classifier ("CF") node 110, a service function forwarder ("SFF") node 120, and a service function ("SF") node 130. For example, SFF nodes 120 include an SFF node 120a and an SFF node 120b, and SF nodes 130 include an SF node 130a, an SF node 130b, and an SF node 130c. As shown in FIG. 1, when a data packet arrives at the CF node 110, the CF node 110 parses a service attribute (for example, a 5-tuple and/or a tenant type) of the data packet, and determines a service function path ("SFP") of the data packet based on an SFC forwarding table. It should be understood that, after receiving the data packet, the CF node determines, based on a service policy and the service attribute of the data packet, the service function chain corresponding to the data packet, and then determines, based on the SFC forwarding table of the service function chain corresponding to the data packet, the service function path corresponding to the data packet. After matching the service function path with the data packet, the CF node encapsulates the data packet, an encapsulated data packet includes an SFC header, and the SFC header includes a service function path identifier ("SFP-ID") used to indicate the SFP that matches the data packet. Then, the CF node 110 forwards the encapsulated data packet (a data packet including a shaded area shown in FIG. 1, where the shaded area represents the SFC header) to the SFF node 120a (it should be understood that the SFF node 120a is a node in the service function path of the data packet). The SFF node 120a learns of the SFP of the data packet based on the locally stored SFC forwarding table and the SFP-ID of the data packet, and forwards the encapsulated data packet to the SF node 130a based on the SFP. After processing the data packet, the SF node 130a returns a processed data packet to the SFF node 120a. The SFF node 120a continues to forward, based on the SFP of the data packet, the data packet processed by the SF node 130a to the SFF node 130b. By analogy, the data packet is transmitted until arriving at a destination node of the SFP of the data packet.

It may be learned from the foregoing that, nodes (the CF node, the SFF node, and the SF node) in the SFC transmit the data packet based on the service function path (SFP). In other words, the nodes transmit the data packet based on the SFC forwarding table. In addition, the SFC forwarding table is determined based on network topology information of the SFC. Therefore, before the data packet is forwarded, a network topology of the SFC needs to be discovered. To be specific, related information of the CF node, the SFF node, and the SF node in the SFC needs to be learned of. In a current technology, usually, the network topology information of the SFC is manually configured on a control node of the SFC. Then, the control node generates the SFC forwarding table based on the network topology information of the SFC, and further delivers the SFC forwarding table to the CF node and the SFF node in the SFC. When the network topology of the SFC is obtained through manual configuration, manual operations are complex and there is a lack of flexibility. For example, when an SF node in the SFC is deleted or moved, manual configuration needs to be performed again.

In addition, in the prior art, after generating the SFC forwarding table based on the network topology information of the SFC, the control node delivers the SFC forwarding table to the CF node and the SFF node in the SFC in a one-to-one manner by using the southbound interface protocol (such as OpenFlow). In such a manner, the CF node and each SFF node in the SFC need to support the southbound interface protocol. In addition, the one-to-one delivery manner also causes relatively low efficiency of synchronizing the SFC forwarding table.

For the foregoing technical problem, the embodiments of the present application provide a service function chain SFC-based communications method and system, and an apparatus, so as to flexibly and automatically discover the network topology of the SFC and improve efficiency of synchronizing the SFC forwarding table.

Figure 2:
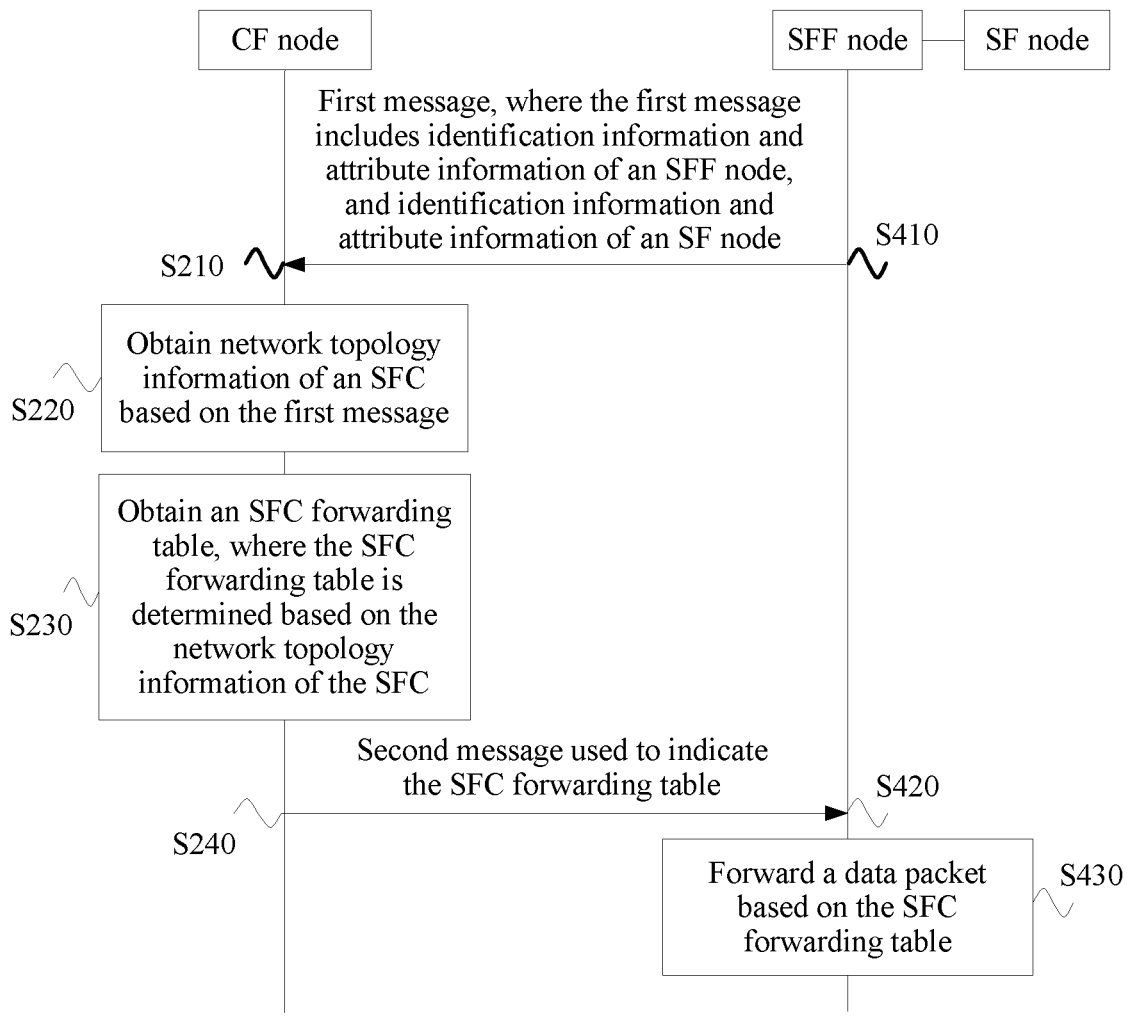
FIG. 2 is a schematic flowchart of an SFC-based communication method according to an embodiment of the present application.

FIG. 2 is a schematic flowchart of a service function chain SFC-based communication method 200 according to an embodiment of the present application. The SFC includes a classifier CF node, a service function forwarder SFF node, and a service function SF node, and the SFF node is connected to the SF node. The communication method 200 includes the following steps:

S210. The CF node receives a first message from the SFF node, where the first message includes identification information and attribute information of the SFF node, and identification information and attribute information of the SF node.

S220. The CF node obtains network topology information of the SFC based on the first message, where the network topology information of the SFC includes the identification information and the attribute information of the SFF node, the identification information and the attribute information of the SF node, and information used to indicate a connection relationship between the SFF node and the SF node.

S230. The CF node obtains an SFC forwarding table, where the SFC forwarding table is determined based on the network topology information of the SFC.

S240. The CF node sends, to the SFF node, a second message used to indicate the SFC forwarding table, so that the SFF node forwards a data packet based on the SFC forwarding table.

In the present application, the CF node in the SFC receives the first message from the SFF node in the SFC, and the first message includes the identification information and the attribute information of the SFF node, and the identification information and the attribute information of the SF node that has a connection relationship with the SFF node. Therefore, the CF node can obtain the network topology information of the SFC, that is, the CF node discovers a network topology of the SFC. Compared with the prior art in which the network topology of the SFC is discovered through manual configuration, in the method provided in the present application, the network topology of the SFC can be flexibly and efficiently discovered, and operation costs can also be reduced.

In addition, the method provided in the present application can be effectively applied to a case in which the network topology of the SFC changes. For example, when the SF node in the SFC is moved or deleted, the CF node can sense a change of the network topology of the SFC in a timely manner by using the method provided in the present application, so as to update the network topology information of the SFC in a timely manner.

Therefore, in the method provided in the present application, the network topology of the SFC can be flexibly and efficiently discovered, the SFC forwarding table generated based on the network topology of the SFC is then obtained, and the SFC forwarding table is sent to the SFF node in the SFC, so as to synchronize the SFC forwarding table.

FIG. 2 shows communication between the CF node and one SFF node. It should be understood that the example shown in FIG. 2 is used to help a person skilled in the art to better understand the embodiments of the present application, but is not intended to limit the scope of the embodiments of the present application. Apparently, a person skilled in the art can perform various equivalent modifications or changes based on the example provided in FIG. 2, and such modifications or changes also fall within the scope of the embodiments of the present application. For example, when the SFC includes a plurality of SFF nodes, each SFF node sends a corresponding first message to the CF node, and the CF node also sends the SFC forwarding table to each SFF node in the SFC. For example, when the SFC includes a first SFF node, a second SFF node, and a third SFF node, the three SFF nodes separately send first messages to the CF node, where the first SFF node is connected to a first SF node (the first SF node may include one or more SF nodes), the second SFF node is connected to a second SF node, and the third SFF node is connected to a third SF node. The first message sent by the first SFF node includes identification information and attribute information of the first SFF node, and identification information and attribute information of the first SF node. The first message sent by the second SFF node includes identification information and attribute information of the second SFF node, and identification information and attribute information of the second SF node. The first message sent by the third SFF node includes identification information and attribute information of the third SFF node, and identification information and attribute information of the third SF node. It should be further understood that, the CF node can obtain the network topology information of the SFC by separately receiving the first messages sent by the first SFF node, the second SFF node, and the third SFF node. The CF node sends the SFC forwarding table to the first SFF node, the second SFF node, and the third SFF node, to synchronize the SFC forwarding table. It should be understood that, the SFF node in this embodiment of the present application may represent any SFF node in the SFC. In addition, it should be understood that one SFF node in the SFC may be connected to one or more SF nodes.

It should be understood that the network topology information of the SFC includes identification information (such as an IP address) and attribute information (such as a role) of each SFF node and each SF node in the SFC, and information about a connection relationship between each SFF node and a corresponding SF node. A scenario shown in FIG. 1 is used as an example. The network topology information of the SFC 100 includes respective IP addresses and roles of the SFF node 120a, the SFF node 120b, the SF node 130a, the SF node 130b, and the SF node 130c, a connection relationship between the SFF node 120a and each of the SF node 130a and the SF node 130b, and a connection relationship between the SFF node 120b and the SF node 130c.

In this embodiment of the present application, optionally, S210 in which the CF node receives a first message from the SFF node includes:

The CF node receives the first message from the SFF node in a multicast manner.

Specifically, after the CF node and each SFF node in the SFC join a particular multicast group by sending a report packet of the Internet Group Management Protocol ("IGMP"), a multicast tree is established by using an existing multicast routing protocol or a solution provided by an IETF BIER working group. In this way, when an outer destination IP address and an outer destination MAC address of a first message sent by each SFF node are respectively a multicast IP address and a multicast MAC address of the particular multicast group, the CF node in the particular multicast group can receive the first message, and therefore obtain the network topology information of the SFC.

It should be understood that each member node in the particular multicast group can receive the first message whose destination address is a multicast address of the particular multicast group. That is, the CF node can receive the first message from the SFF node in a multicast manner, and therefore obtain the network topology information of the SFC. It should be understood that, in this implementation, each SFF node in the particular multicast group can also receive, in a multicast manner, a first message sent by another SFF node, and therefore can also obtain the network topology information of the SFC.

Therefore, compared with the prior art in which the network topology of the SFC is discovered through manual configuration, in the present application, the network topology of the SFC can be relatively flexibly and efficiently discovered.

In this embodiment of the present application, optionally, S210 in which the CF node receives a first message from the SFF node includes:

The CF node receives the first message from the SFF node in a flood manner.

Specifically, a specific SFF node sends the first message through all interfaces of the specific SFF node. To be specific, a neighboring node of the specific SFF node receives the first message, and then the neighboring node sends the first message through another interface other than an interface that receives the first message. By analogy, the first message sent by the specific SFF node arrives at each node in a network in a flood manner. In other words, the first message sent by the specific SFF node arrives at both the CF node in the SFC and another SFF node in the SFC. In this way, each node in the SFC can flexibly and efficiently discover the network topology information of the SFC.

Optionally, in this embodiment of the present application, the communication method 200 further includes the following step:

S250. The CF node sends, in a multicast manner or a flood manner, a third message including identification information and attribute information of the CF node to the SFF node, where a protocol used for the third message is the IS-IS protocol or the OSPF protocol, and the third message includes a CF field used to indicate the identification information and the attribute information of the CF node.

It should be understood that the SFF node can identify a function and a role of the CF node based on the third message, so as to help subsequently effectively receive the SFC forwarding table sent by the CF node.

Figure 3:
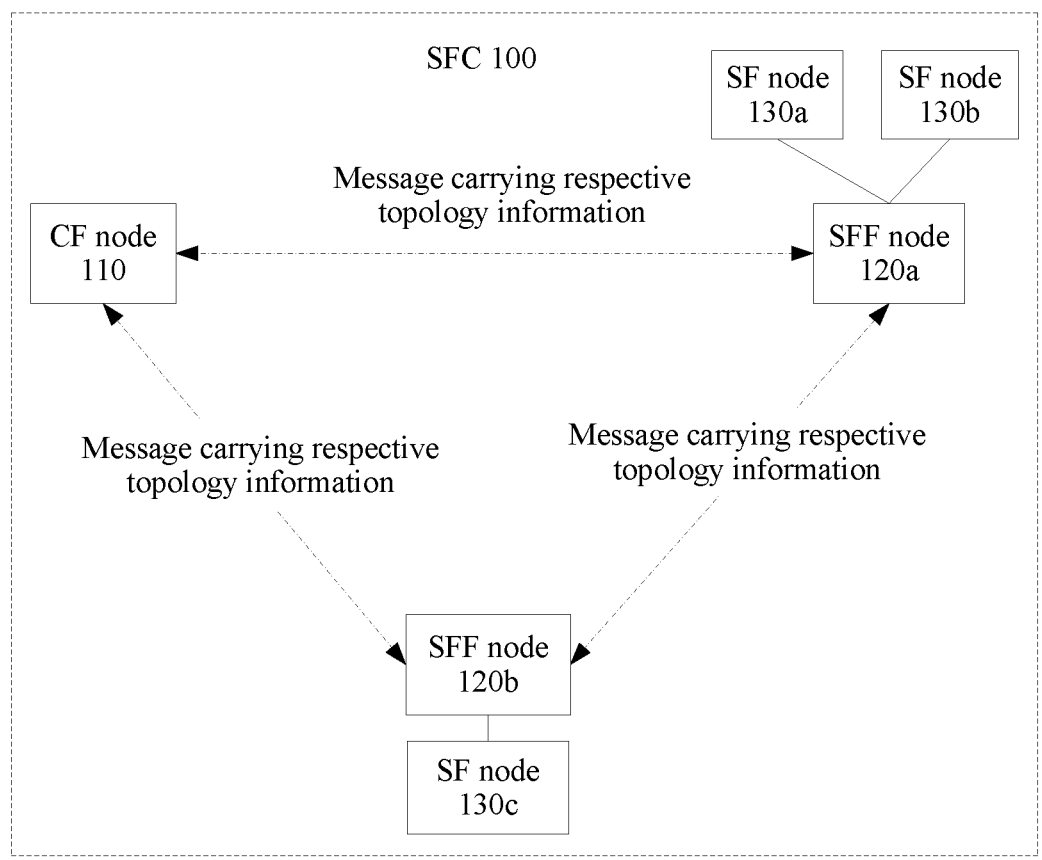
FIG. 3 is another schematic flowchart of an SFC-based communication method according to an embodiment of the present application.

Optionally, the CF node may send the third message to the SFF node while receiving the first message sent by the SFF node. Specifically, that the SFC includes two SFF nodes is used as an example in FIG. 3. FIG. 3 is a schematic diagram in which the CF node and the two SFF nodes send a message to each other. The CF node 110, the SFF node 120a, and the SFF node 120b in the SFC 100 separately send, in a flood manner or a multicast manner, messages carrying respective related topology information.

Specifically, for example, the CF node 110 sends, in a flood manner, a message including identification information and attribute information of the CF node, and the message finally floods to the SFF node 120a and the SFF node 120b. The SFF node 120a sends, in a flood manner, a message including identification information and attribute information of the SFF node 120a, and identification information and attribute information of the SF node 130a and the SF node 130b. The message finally floods to the CF node 110 and the SFF node 120b. The SFF node 120b sends, in a flood manner, a message including identification information and attribute information of the SFF node 120b, and identification information and attribute information of the SF node 130c. The message finally floods to the CF node 110 and the SFF node 120a.

Specifically, for example, when the CF node 110, the SFF node 120a, and the SFF node 120b shown in FIG. 3 join a particular multicast group, a destination IP address and a destination MAC address of the message sent by each of the CF node 110, the SFF node 120a, and the SFF node 120b are respectively a multicast IP address and a multicast MAC address of the particular multicast group. In this way, the CF node 110, the SFF node 120a, and the SFF node 120b all can receive the messages sent by each other.

In the foregoing solution described with reference to FIG. 3, both the CF node and the SFF node in the SFC can receive a message that carries related topology information, and therefore can obtain the network topology information of the SFC.

It should be understood that the example shown in FIG. 3 is used to help a person skilled in the art to better understand the embodiments of the present application, but is not intended to limit the scope of the embodiments of the present application. Apparently, a person skilled in the art can perform various equivalent modifications or changes based on the example provided in FIG. 3, and such modifications or changes also fall within the scope of the embodiments of the present application.

Therefore, in this embodiment of the present application, the CF node and each SFF node in the SFC send a message that has related topology information to each other, so that the CF node and each SFF node can automatically discover the network topology of the SFC. Compared with the prior art in which the network topology of the SFC is discovered in through manual configuration, in the method in this embodiment of the present application, the network topology of the SFC can be relatively flexibly and efficiently discovered.

Optionally, in this embodiment of the present application, a protocol used for the first message that is sent by the SFF node to the CF node is the Intermediate System to Intermediate System IS-IS protocol or the Open Shortest Path First OSPF protocol, and the first message includes an SFF field used to indicate the identification information and the attribute information of the SFF node, and an SF field used to indicate the identification information and the attribute information of the SF node.

Figures 4, 5:
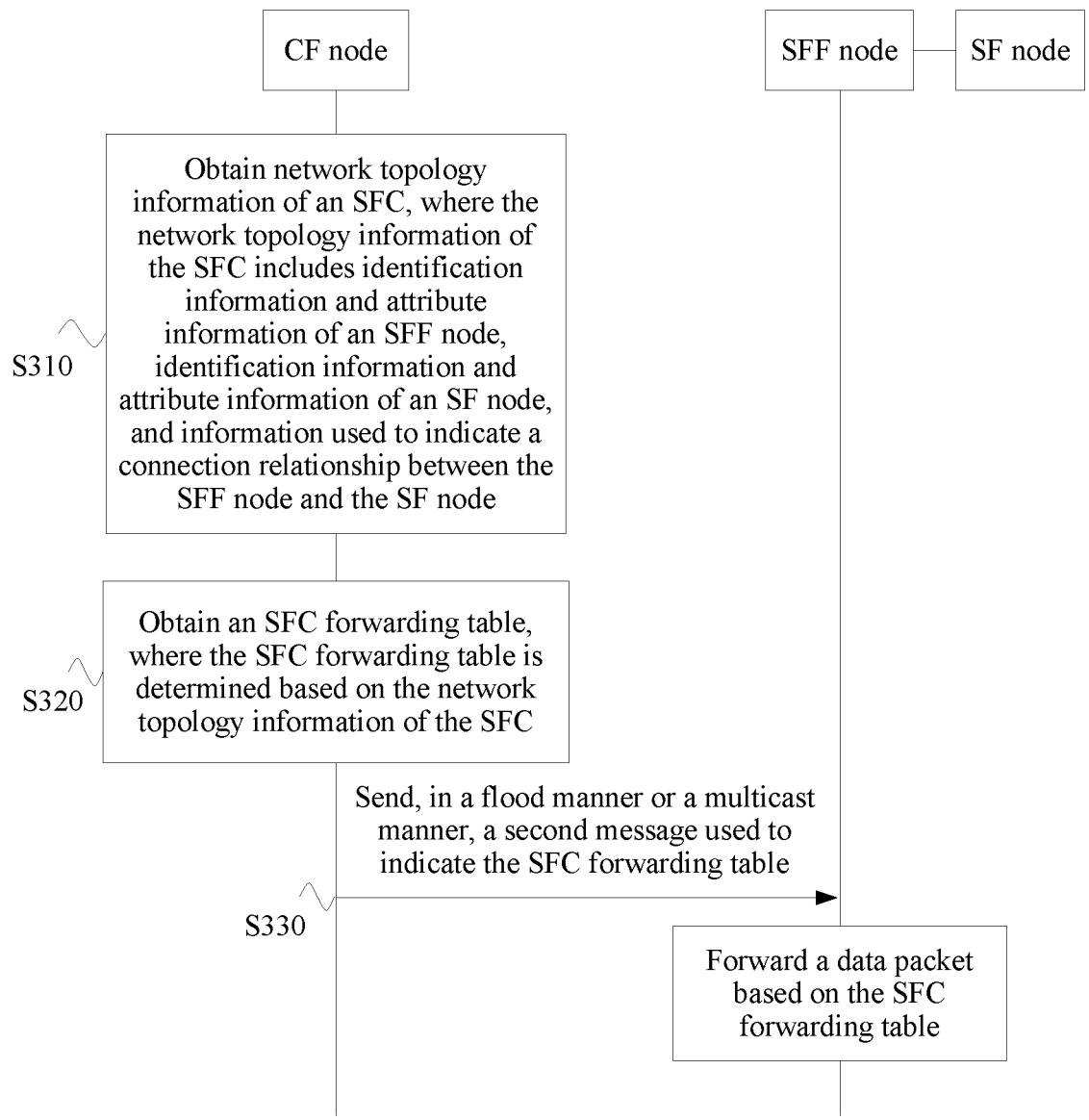
FIG. 4 is still another schematic flowchart of an SFC-based communication method according to an embodiment of the present application.
FIG. 5 is a schematic diagram of encapsulation of an IS-IS packet according to an embodiment of the present application.

Specifically, a header format of the first message for which the IS-IS protocol is used is shown in FIG. 5. An IS-IS packet is sequentially encapsulated by using a data link layer header (L2 header) 1, a GRE header, an IP header, and a data link layer header (L2 header) 2. It should be understood that a conventional IS-IS protocol works at an L2 layer. To be specific, a conventional IS-IS packet is encapsulated as a frame by using a protocol header of the L2 layer (for example, the L2 header 1 in FIG. 5). However, because the SFC is deployed at an L3 layer, to exchange information between the CF node and the SFF node by using the IS-IS protocol, a conventional IS-IS frame needs to be encapsulated by using a protocol header of the L3 layer (for example, an IP header in FIG. 5). It should be noted that, when both the CF node and the SFF node join a particular multicast group, the L2 header 2 and the IP header shown in FIG. 5 are respectively a MAC address and an IP address of the particular multicast group.

It should be understood that FIG. 5 is only a schematic diagram of a header of a first message for which the IS-IS protocol is used, and does not show a load part of the first message. The load part of the first message includes the SFF field used to indicate the identification information and the attribute information of the SFF node, and the SF field used to indicate the identification information and the attribute information of the SF node. For example, the IS-IS protocol may be extended in a TLV manner to implement the SFF field and the SF field, and details are as follows:

SFF sub-TLV: releasing the identification information and the attribute information of the SFF node; and SF sub-TLV: releasing the identification information and the attribute information of the SF node.

Figure 6:
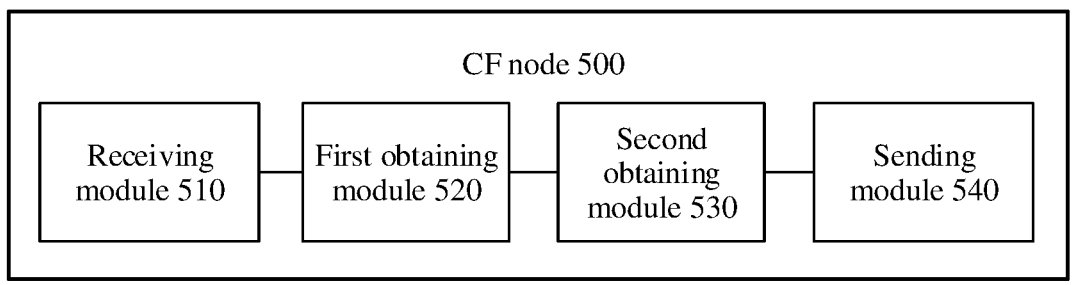
FIG. 6 is a schematic diagram of encapsulation of an OSPF packet according to an embodiment of the present application.

Specifically, a header format of the first message for which the OSPF protocol is used is shown in FIG. 6. An OSPF packet is sequentially encapsulated by using an IP header 1, a GRE header, an IP header 2, and a data link layer header (L2 header). It should be understood that the OSPF protocol is a protocol that works at an L3 layer, and may be directly used for transmission between the CF node and the SFF node. It should be noted that, when both the CF node and the SFF node join a particular multicast group, the L2 header and the IP header 2 shown in FIG. 6 are respectively a MAC address and an IP address of the particular multicast group.

It should be understood that FIG. 6 is only a schematic diagram of a header of a first message for which the OSPF protocol is used, and does not show a load part of the first message. The load part of the first message includes the SFF field used to indicate the identification information and the attribute information of the SFF node, and the SF field used to indicate the identification information and the attribute information of the SF node. For example, the OSPF protocol may be extended in a TLV manner to implement the SFF field and the SF field, and details are as follows:

SFF sub-TLV: releasing the identification information and the attribute information of the SFF node; and SF sub-TLV: releasing the identification information and the attribute information of the SF node.

Optionally, in this embodiment of the present application, the IS-IS protocol or the OSPF protocol may also be used for the third message that is sent by the CF node to the SFF node and that includes the identification information and the attribute information of the CF node.

Specifically, when the protocol used for the third message is the IS-IS protocol, a header of the third message is shown in FIG. 5. A load part of the third message includes the CF field used to indicate the identification information and the attribute information of the CF node. Specifically, the IS-IS protocol may be extended in a TLV manner to implement the CF field, and details are as follows:

CF sub-TLV: releasing the identification information and the attribute information of the CF node.

Specifically, when the protocol used for the third message is the OSPF protocol, a header of the third message is shown in FIG. 6. A load part of the third message includes the CF field used to indicate the identification information and the attribute information of the CF node. Specifically, the OSPF protocol may be extended in a TLV manner to implement the CF field, and details are as follows:

CF sub-TLV: releasing the identification information and the attribute information of the CF node.

Optionally, in this embodiment of the present application, S230 in which the CF node obtains an SFC forwarding table includes:

When the CF node is a control node of the SFC, the CF node generates the SFC forwarding table based on the obtained network topology information of the SFC.

Alternatively, when the CF node is not a control node of the SFC, the CF node reports the obtained network topology information of the SFC to a control node, the control node generates the SFC forwarding table based on the network topology information of the SFC, and the CF node obtains the SFC forwarding table from the control node.

Specifically, the control node is a node that can generate the SFC forwarding table. Specifically, the control node generates the SFC forwarding table based on the network topology information of the SFC, a service attribute of a data packet, and a service policy of a control layer.

For example, the control node may be the CF node or an SFF node in the SFC, or may be an upper-layer system device of the SFC. This is not limited in this embodiment of the present application.

Optionally, in this embodiment of the present application, S240 in which the CF node sends, to the SFF node, a second message used to indicate the SFC forwarding table includes:

The CF node sends the second message to the SFF node in a multicast manner.

Specifically, for example, both the CF node and the SFF node in the SFC join a particular multicast group, and a destination address of the second message that is sent by the CF node and that is used to indicate the SFC forwarding table is a multicast address of the particular multicast group. It should be understood that each member node in the particular multicast group can receive the second message whose destination address is the multicast address of the particular multicast group. Therefore, in this embodiment of the present application, provided that the CF node sends the second message through all local interfaces, the second message can arrive at each SFF node based on the multicast address. Compared with the prior art in which each node in the SFC needs to support the southbound interface protocol when the SFC forwarding table is delivered to the node in the SFC by using the southbound interface protocol, in the method in the present application, operability of synchronizing the SFC forwarding table can be effectively improved, and efficiency of synchronizing the SFC forwarding table can also be improved.

Optionally, in this embodiment of the present application, S240 in which the CF node sends, to the SFF node, a second message used to indicate the SFC forwarding table includes:

The CF node sends the second message to the SFF node in a flood manner.

Specifically, for example, the CF node sends the second message through all ports of the CF node. To be specific, a neighboring node of the CF node receives the second message, and then the neighboring node sends the second message through another port other than a port that receives the second message. By analogy, the second message sent by the CF node arrives at each SFF node in the SFC. In this embodiment of the present application, the SFC forwarding table is synchronized in a flood manner. Compared with the prior art in which each node in the SFC needs to support the southbound interface protocol when the SFC forwarding table is delivered to the node in the SFC by using the southbound interface protocol, in the method in the present application, operability of synchronizing the SFC forwarding table can be effectively improved, and efficiency of synchronizing the SFC forwarding table can also be improved.

Optionally, in this embodiment of the present application, an entry of the SFC forwarding table includes indication information used to indicate a service function path, and the indication information includes the identification information of the SFF node and at least one of the identification information and the attribute information of the SF node.

Specifically, the scenario shown in FIG. 1 is used as an example. For example, a service function path P1 is as follows: SFF node 120*a*-SF node 130*a*-SFF node 120*b*-SF node 130*c*. Indication information used to indicate the service function path P1 may be as follows: SFF ID (120*a*)- SF ID (130*a*)-SFF ID (120*b*)-SF ID (130*c*). The SFF ID (120*a*) represents identification information of the SFF node 120*a*, and so on. It should be understood that recorded information "SFF ID (120*a*)-SF ID (130*a*)-SFF ID (120*b*)-SF ID (130*c*)" in the entry of the SFC forwarding table represents the service function path P1. For another example, a service function path P2 is as follows: SFF node 120*a*-SF node with attribute information of A-SFF node 120*b*-SF node 130*c*. Indication information used to indicate the service function path P2 may be as follows: SFF ID (120*a*)-SF Type (A)-SFF ID (120*b*)-SF ID (130*c*). The SF Type (A) indicates that the attribute information of an SF node is A. In this case, recorded information "SFF ID (120*a*)-SF Type (A)-SFF ID (120*b*)-SF ID (130*c*)" in the entry of the SFC forwarding table represents the service function path P2. It should be understood that, assuming that attribute information of both the SF node 130*a* and the SF node 130*b* in FIG. 1 is A, an SF node that is in the service function path P2 and whose attribute information is A may be the SF node 130*a* or the SF node 130*b*.

It should be further understood that, the service function path recorded in the entry of the SFC forwarding table may be uniquely corresponding to a service function path identifier (SFP-ID). For example, in the foregoing example, a service function path identifier of the service function path P1 is an SFP-ID (1), and a service function path identifier of the service function path P2 is an SFP-ID (2). A data packet encapsulated by the CF node includes an SFC header, and the SFC header includes a service function path identifier (SFP-ID) used to indicate a service function path. A specific SFF node that receives the encapsulated data packet can determine a service function path of the data packet based on the locally stored SFC forwarding table and the SFP-ID carried in the SFC header, and therefore can forward the data packet based on the service function path.

Specifically, in this embodiment of the present application, the service function path in the SFC may be strict, loose, or hybrid. Each hop of a strict SFP is determinate, for example, the service function path P1 in the foregoing example. Each hop of a loose SFP is not necessarily determinate, for example, a service function path P3: SF node with attribute information of A-SF node with attribute information of B-SF node with attribute information of C. It should be understood that there may be more than one SF node with the attribute information of A. For example, both two SF nodes in FIG. 1 that are connected to the SFF node 120*a* are SF nodes with the attribute information of A. Therefore, each hop of such a loose SFP is not necessarily determinate. A hybrid SFP is any combination of a strict SFP and a loose SFP, for example, the service function path P2 in the foregoing example. In P2, a jump between some nodes is determinate, for example, SFF node 120*b*-SF node 130*a*. However, a jump between some nodes is indeterminate, for example, SFF node 120*a*-SF node with attribute information of A.

It should be understood that, for the loose SFP and the hybrid SFP, some SFF nodes cannot determine, by depending on only the service function path of the data packet, a next-hop SFF node to which the data packet should be sent. In this case, the SFF nodes need to dynamically determine the next-hop SFF node with reference to the locally obtained network topology information of the SFC.

It may be learned from the foregoing that the second message used to indicate the SFC forwarding table includes the identification information of the SFF node and at least one of the identification information and the attribute information of the SF node.

Optionally, in this embodiment of the present application, a protocol used for the second message is the IS-IS protocol or the OSPF protocol. The second message includes an SF field used to indicate at least one of the identification information and the attribute information of the SF node, and an SFF field used to indicate the identification information of the SFF node.

Specifically, when the protocol used for the second message is the IS-IS protocol, a header of the second message is shown in FIG. 5. A load part of the second message includes the SF field used to indicate the at least one of the identification information and the attribute information of the SF node, and the SFF field used to indicate the identification information of the SFF node. Specifically, the IS-IS protocol may be extended in a TLV manner to implement the SF field and the SFF field, and details are as follows:

SF sub-TLV: releasing the identification information or the attribute information of the SF node; and SFF sub-TLV: releasing the identification information of the SFF node.

Specifically, when the protocol used for the second message is the OSPF protocol, a header of the second message is shown in FIG. 6. A load part of the second message includes the SF field used to indicate the at least one of the identification information and the attribute information of the SF node, and the SFF field used to indicate the identification information of the SFF node. Specifically, the OSPF protocol may be extended in a TLV manner to implement the SF field and the SFF field, and details are as follows:

SF sub-TLV: releasing the identification information or the attribute information of the SF node; and SFF sub-TLV: releasing the identification information of the SFF node.

Therefore, in this embodiment of the present application, the SFC forwarding table can be synchronized by using the relatively general IS-IS protocol or OSPF protocol. Compared with the prior art in which each node in the SFC needs to support the southbound interface protocol when the SFC forwarding table is delivered to the node in the SFC by using the southbound interface protocol, in the method in the present application, operability of synchronizing the SFC forwarding table can be effectively improved.

FIG. 4 is a schematic flowchart of a service function chain SFC-based communication method 300 according to an embodiment of the present application. The SFC includes a classifier CF node, a service function forwarder SFF node, and a service function SF node, and the SFF node is connected to the SF node. The communication method 300 includes the following steps:

S310. The CF node obtains network topology information of the SFC, where the network topology information of the SFC includes identification information and attribute information of the SFF node, identification information and attribute information of the SF node, and information used to indicate a connection relationship between the SFF node and the SF node.

S320. The CF node obtains an SFC forwarding table, where the SFC forwarding table is determined based on the network topology information of the SFC.

S330. The CF node sends, to the SFF node in a flood manner or a multicast manner, a second message used to indicate the SFC forwarding table, so that the SFF node forwards a data packet based on the SFC forwarding table.

Therefore, in this embodiment of the present application, the SFC forwarding table is synchronized in a flood manner or a multicast manner. Compared with the prior art in which each node in the SFC needs to support the southbound interface protocol when the SFC forwarding table is delivered to the node in the SFC by using the southbound interface protocol, in the method in the present application, operability of synchronizing the SFC forwarding table can be effectively improved, and efficiency of synchronizing the SFC forwarding table can also be improved.

Specifically, S310 specifically includes S210 and S220. For brevity, details are not described herein again.

S320 is corresponding to S230 above, and S330 is corresponding to S240 above. For brevity, details are not described herein again.

FIG. 2 is further a schematic flowchart of a service function chain-based communication method 400, described from a perspective of an SFF node, according to an embodiment of the present application. As shown in FIG. 2, the SFC includes a classifier CF node, a first service function forwarder SFF node, and a first service function SF node, and the first SFF node is connected to the first SF node. The communication method 400 includes the following steps:

S410. The first SFF node sends a first message to the CF node, where the first message includes identification information and attribute information of the first SFF node, and identification information and attribute information of the first SF node, so that the CF node obtains network topology information of the SFC based on the first message, where the network topology information of the SFC includes the identification information and the attribute information of the first SFF node, the identification information and the attribute information of the first SF node, and information used to indicate a connection relationship between the first SFF node and the first SF node.

S410 is corresponding to S210 and S220 in the communication method 200 provided in the embodiment of the present application. For brevity, details are not described herein again.

S420. The first SFF node receives, from the CF node, a second message used to indicate an SFC forwarding table, where the SFC forwarding table is determined based on the network topology information of the SFC.

S420 is corresponding to S230 and S240 in the communication method 200 provided in the embodiment of the present application. For brevity, details are not described herein again.

S430. The first SFF node forwards a data packet based on the SFC forwarding table.

Specifically, the first SFF node can determine a service function path of the data packet based on an SFP-ID included in an SFC header of the data packet and the SFC forwarding table, and therefore forward the data packet based on the service function path.

In the present application, the SFF node in the SFC sends the first message to the CF node, and the first message includes the identification information and the attribute information of the SFF node, and the identification information and the attribute information of the SF node that has a connection relationship with the SFF node. Therefore, the CF node can obtain the network topology information of the SFC, that is, the CF node discovers a network topology of the SFC. Compared with the prior art in which the network topology of the SFC is discovered through manual configuration, in the method provided in the present application, the network topology of the SFC can be flexibly and efficiently discovered, and operation costs can also be reduced.

In addition, the method provided in the present application can be effectively applied to a case in which the network topology of the SFC changes. For example, when the SF node in the SFC is moved or deleted, the CF node can sense a change of the network topology of the SFC in a timely manner by using the method provided in the present application, so as to update the network topology information of the SFC in a timely manner.

Therefore, in the method provided in the present application, the network topology of the SFC can be flexibly and efficiently discovered, the SFC forwarding table generated based on the network topology of the SFC is then obtained, and the SFC forwarding table is sent to the SFF node in the SFC, so as to synchronize the SFC forwarding table.

It should be understood that the first SFF node may be each SFF node in the SFC. That is, the foregoing step is applicable to each SFF node in the SFC.

In the present application, each SFF node in the SFC sends the first message including the identification information and the attribute information of the SFF node and the identification information and the attribute information of the SF node to the CF node, so that the CF node discovers the network topology of the SFC by using the first message. Compared with the prior art in which the network topology of the SFC is discovered through manual configuration, in the method provided in the present application, the network topology of the SFC can be flexibly and efficiently discovered, and costs can also be reduced.

In addition, the method provided in the present application can be effectively applied to a case in which the network topology of the SFC changes. For example, when the SF node in the SFC is moved or deleted, the CF node can sense a change of the network topology of the SFC in a timely manner by using the method provided in the present application, so as to update the network topology information of the SFC in a timely manner.

Therefore, in the method provided in this embodiment of the present application, the network topology of the SFC can be flexibly and efficiently discovered, and therefore the SFC forwarding table generated based on the network topology of the SFC is sent to each SFF node in the SFC, so that each SFF node forwards a data packet based on the SFC forwarding table.

Optionally, in this embodiment of the present application, S410 in which the first SFF node in the SFF nodes in the SFC sends a first message to the CF node includes:

The first SFF node sends the first message to the CF node in a flood manner.

Optionally, in this embodiment of the present application, S410 in which the first SFF node in the SFF nodes in the SFC sends a first message to the CF node includes:

The first SFF node sends the first message to the CF node in a multicast manner.

Specifically, the CF node and each SFF node in the SFC all join a particular multicast group, and a destination address of the first message sent by each SFF node is a multicast address of the particular multicast group. In this way, the CF node in the particular multicast group can receive the first message, and therefore obtain the network topology information of the SFC.

It should be understood that each member node in the particular multicast group can receive a first message that is sent by another member node and whose destination address is the multicast address of the particular multicast group, so that the CF node and each SFF node in the SFC can obtain the network topology information of the SFC based on the received first message.

Therefore, compared with the prior art in which the network topology of the SFC is discovered through manual configuration, in the present application, the network topology of the SFC can be relatively flexibly and efficiently discovered. In addition, a multicast manner is used to transmit the first message including the topology information, so as to prevent the first message from flooding to a node that is not in the SFC.

Optionally, in this embodiment of the present application, S410 in which the first SFF node sends a first message to the CF node includes:

The first SFF node sends the first message to the CF node in a multicast manner.

Specifically, both the CF node and the SFF node in the SFC join a particular multicast group, and a destination address of the first message sent by the SFF node is a multicast address of the particular multicast group. It should be understood that each member node in the particular multicast group can receive the first message whose destination address is the multicast address of the particular multicast group, that is, the CF node can receive the first message from the SFF node in a multicast manner, and therefore obtain the network topology information of the SFC. It should be understood that, in this implementation, each SFF node in the particular multicast group can also receive, in a multicast manner, a first message sent by another SFF node, and therefore can also obtain the network topology information of the SFC.

Optionally, in this embodiment of the present application, S410 in which the first SFF node sends a first message to the CF node includes:

The first SFF node sends the first message to the CF node in a flood manner.

Optionally, in this embodiment of the present application, a protocol used for the first message is the Intermediate System to Intermediate System IS-IS protocol or the Open Shortest Path First OSPF protocol, and the first message includes an SFF field used to indicate the identification information and the attribute information of the first SFF node, and an SF field used to indicate the identification information and the attribute information of the first SF node.

As shown in FIG. 5 and FIG. 6, for details, refer to the foregoing description made with reference to the method 200. The details are not described herein again.

Optionally, in this embodiment of the present application, S420 in which the first SFF node receives, from the CF node, a second message used to indicate the SFC forwarding table includes:

The first SFF node receives the second message from the CF node in a multicast manner.

Optionally, in this embodiment of the present application, S420 in which the first SFF node receives, from the CF node, a second message used to indicate the SFC forwarding table includes:

The first SFF node receives the second message from the CF node in a flood manner.

Optionally, in this embodiment of the present application, an entry of the SFC forwarding table includes indication information used to indicate a service function path, and the indication information includes the identification information of the first SFF node and at least one of the identification information and the attribute information of the first SF node.

Optionally, in this embodiment of the present application, a protocol used for the second message in S420 is the IS-IS protocol or the OSPF protocol.

As shown in FIG. 5 and FIG. 6, for details, refer to the foregoing description made with reference to the method 200. The details are not described herein again.

Optionally, in this embodiment of the present application, the communication method 400 further includes the following step:

S440. The first SFF node receives, from the CF node in a multicast manner or a flood manner, a third message including identification information and attribute information of the CF node, where a protocol used for the third message is the IS-IS protocol or the OSPF protocol, and the third message includes a CF field used to indicate the identification information and the attribute information of the CF node.

It should be understood that the SFF node can identify a function and a role of the CF node based on the third message, so as to help subsequently effectively receive the SFC forwarding table sent by the CF node.

As shown in FIG. 3, for details, refer to the foregoing description. The details are not described herein again.

Optionally, in this embodiment of the present application, the communication method 400 further includes:

receiving, by the first SFF node, a fourth message from a second SFF node in the SFC in a flood manner or a multicast manner, where the fourth message includes identification information and attribute information of the second SFF node, and identification information and attribute information of a second SF node that has a connection relationship with the second SFF node, and the first SFF node and the second SFF node are different SFF nodes;

obtaining, by the first SFF node, the network topology information of the SFC based on the fourth message; and sending, by the first SFF node, the first message to the second SFF node in a flood manner or a multicast manner, so that the second SFF node obtains the network topology information of the SFC based on the first message.

A protocol used for each of the fourth message and the first message is the IS-IS protocol or the OSPF protocol. The fourth message includes an SFF field used to indicate the identification information and the attribute information of the second SFF node, and an SF field used to indicate the identification information and the attribute information of the second SF node. The first message includes the SFF field used to indicate the identification information and the attribute information of the first SFF node, and the SF field used to indicate the identification information and the attribute information of the first SF node.

Specifically, as shown in FIG. 3, the first SFF node and the second SFF node in this embodiment of the present application are respectively corresponding to the SFF node 120$a$ and the SFF node 120$b$ in FIG. 3. For details, refer to the foregoing description made with reference to FIG. 3. The details are not described herein again.

It should be understood that, the first SFF node and the second SFF node represent any two SFF nodes in the SFC. For example, the SFC includes three SFF nodes, the first SFF node may be any SFF node in the three SFF nodes, and the second SFF node may be any SFF node other than the SFF node in the three SFF nodes. It should be understood that, each of the three SFF nodes sends the first message to the CF node, and the three SFF nodes send, to each other, messages including identification information and attribute information related to the three SFF nodes. It should be understood that the fourth message may be a message in a same format as the first message.

Specifically, for example, the CF node in the SFC and each SFF node in the SFC all join a particular multicast group, and each member node in the particular multicast group can receive a first message that is sent by another member node and whose destination address is a multicast address of the particular multicast group. Therefore, the CF node and each SFF node in the SFC all can obtain the network topology information of the SFC based on the received first message. When a service function path in the SFC forwarding table is a loose path such as Type 1 SF-Type 2 SF-Type 3 SF, the CF node and the SFF node can dynamically compute a next-hop node based on the locally obtained network topology information of the SFC. Therefore, in the method provided in the present application, it can be effectively ensured that the SFC effectively forwards a data packet on a forwarding plane.

It should be further understood that the first SFF node and the second SFF node are intended to identify the two SFF nodes as different SFF nodes in the SFC, but are not intended to limit the solutions of the present application. The first SFF node represents each SFF node in the SFC.

It should be further understood that the SFC is a virtual overlay network of a basic underlying network (for example, an underlying IP network). It should be understood that the SFC includes some nodes (for example, nodes that have a service processing and forwarding function) in the basic underlying network. That is, the nodes included in the SFC are not completely physically and directly connected, for example, a network element node such as a router or a switch may be connected between the SFF nodes.

It should be further understood that, network topology information of the basic underlying network is known. To be specific, topology information, in the basic underlying network, of each node included in the SFC is known. Therefore, in this embodiment of the present application, a data packet of the SFC may be forwarded based on the network topology information of the SFC and the topology information of the basic underlying network.

Figure 7:
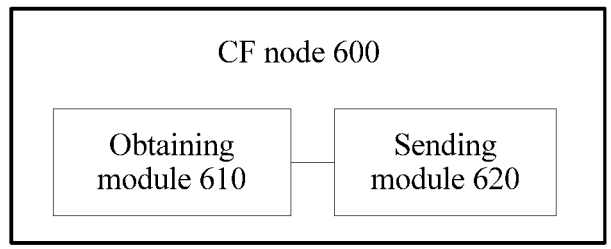
FIG. 7 is a schematic block diagram of a CF node according to an embodiment of the present application.

FIG. 7 is a schematic block diagram of a service function chain SFC-based classifier CF node 500 according to an embodiment of the present application. The SFC includes the CF node 500, a service function forwarder SFF node, and a service function SF node, and the SFF node is connected to the SF node. The CF node 500 includes:

a receiving module 510, configured to receive a first message from the SFF node, where the first message includes identification information and attribute information of the SFF node, and identification information and attribute information of the SF node;

a first obtaining module 520, configured to obtain network topology information of the SFC based on the first message received by the receiving module, where the network topology information of the SFC includes the identification information and the attribute information of the SFF node, the identification information and the attribute information of the SF node, and information used to indicate a connection relationship between the SFF node and the SF node;

a second obtaining module 530, configured to obtain an SFC forwarding table, where the SFC forwarding table is determined based on the network topology information of the SFC that is obtained by the first obtaining module; and a sending module 540, configured to send, to the SFF node, a second message used to indicate the SFC forwarding table obtained by the second obtaining module, so that the SFF node forwards a data packet based on the SFC forwarding table.

In this embodiment of the present application, the CF node receives a message that is sent by each SFF node in the SFC and that includes the identification information and the attribute information of the SFF node and the identification information and the attribute information of the SF node, to discover a network topology of the SFC. Compared with the prior art in which the network topology of the SFC is discovered through manual configuration, in the method provided in the present application, the network topology of the SFC can be flexibly and efficiently discovered, and costs can also be reduced.

It should be understood that the CF node 500 further includes a storage module, configured to store the network topology information of the SFC and the SFC forwarding table.

Optionally, in this embodiment of the present application, the receiving module 510 is configured to receive the first message from the SFF node in a multicast manner.

Optionally, in this embodiment of the present application, the receiving module 510 is configured to receive the first message from the SFF node in a flood manner.

Optionally, in this embodiment of the present application, a protocol used for the first message is the Intermediate System to Intermediate System IS-IS protocol or the Open Shortest Path First OSPF protocol, and the first message includes an SFF field used to indicate the identification information and the attribute information of the SFF node, and an SF field used to indicate the identification information and the attribute information of the SF node.

Optionally, in this embodiment of the present application, the sending module 540 is configured to send the second message to the SFF node in a multicast manner.

Optionally, in this embodiment of the present application, the sending module 540 is configured to send the second message to the SFF node in a flood manner.

Optionally, in this embodiment of the present application, an entry of the SFC forwarding table includes indication information used to indicate a service function path, and the indication information includes the identification information of the SFF node and at least one of the identification information and the attribute information of the SF node.

Optionally, in this embodiment of the present application, a protocol used for the second message is the IS-IS protocol or the OSPF protocol.

Optionally, in this embodiment of the present application, the sending module 540 is further configured to send, in a multicast manner or a flood manner, a third message including identification information and attribute information of the CF node to the SFF node, where a protocol used for the third message is the IS-IS protocol or the OSPF protocol, and the third message includes a CF field used to indicate the identification information and the attribute information of the CF node.

In this embodiment of the present application, the CF node receives a message that is sent by each SFF node in the SFC and that includes the identification information and the attribute information of the SFF node and the identification information and the attribute information of the SF node, to discover a network topology of the SFC. Compared with the prior art in which the network topology of the SFC is discovered through manual configuration, in the method provided in the present application, the network topology of the SFC can be flexibly and efficiently discovered, and costs can also be reduced. The SFC forwarding table generated based on the network topology of the SFC is sent to each SFF node in the SFC, so that each SFF node forwards a data packet based on the SFC forwarding table.

It should be understood that, the CF node 500 in this embodiment of the present application may be corresponding to the CF node in the service function chain SFC-based communication method in the embodiment of the present application, and the foregoing and other operations and/or functions of the modules in the CF node 500 are separately used to implement corresponding procedures of methods in FIG. 2 to FIG. 4. For brevity, details are not described herein again.

Figure 8:
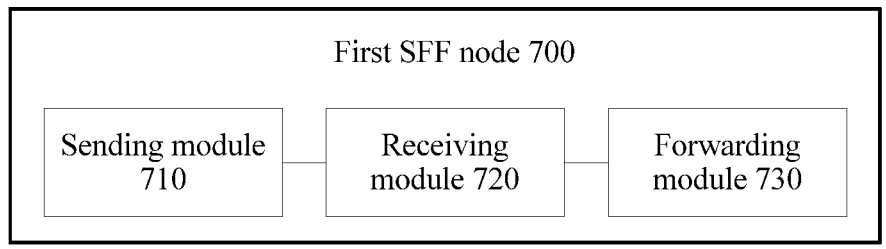
FIG. 8 is another schematic block diagram of a CF node according to an embodiment of the present application.

FIG. 8 is a schematic block diagram of a service function chain SFC-based classifier CF node 600 according to an embodiment of the present application. The SFC includes the CF node 600, a plurality of service function forwarder SFF nodes, and a plurality of service function SF nodes, and each SFF node in the SFC has a connection relationship with the plurality of SF nodes. The CF node 600 includes an obtaining module 610 and a sending module 620.

The obtaining module 610 is configured to obtain network topology information of the SFC, where the network topology information of the SFC includes identification information and attribute information of each SFF node and the plurality of SF nodes in the SFC, and the connection relationship between each SFF node and the plurality of SF nodes in the SFC.

The obtaining module 610 is further configured to obtain an SFC forwarding table, where the SFC forwarding table includes at least one service function path generated based on the network topology information of the SFC that is obtained by the obtaining module 610, and the SFC forwarding table further includes a correspondence between the at least one service function path and a service function path identifier.

The sending module 620 is configured to send, in a flood manner or a multicast manner, a second message including the SFC forwarding table to each of the SFF nodes in the SFC, so that each SFF node forwards a data packet based on the SFC forwarding table.

Therefore, in this embodiment of the present application, the SFC forwarding table is synchronized in a flood manner or a multicast manner. Compared with the prior art in which each node in the SFC needs to support the southbound interface protocol when the SFC forwarding table is delivered to the node in the SFC by using the southbound interface protocol, in the method in the present application, operability of synchronizing the SFC forwarding table can be effectively improved, and efficiency of synchronizing the SFC forwarding table can also be improved.

It should be understood that the CF node 600 further includes a storage module, configured to store the network topology information of the SFC and the SFC forwarding table.

Optionally, in this embodiment of the present application, the obtaining module 610 includes:

a receiving unit, configured to receive a first message sent by each of the SFF nodes in the SFC, where the first message includes identification information and attribute information of the SFF node, and the first message further includes identification information and attribute information of an SF node that is in the plurality of SF nodes and that has a connection relationship with the SFF node; and an obtaining unit, configured to obtain the network topology information of the SFC based on the first message received by the receiving unit.

Optionally, in this embodiment of the present application, the receiving unit is specifically configured to receive the first message sent by each SFF node in a multicast manner.

Optionally, in this embodiment of the present application, the receiving unit is specifically configured to receive the first message sent by each SFF node in a flood manner.

Optionally, in this embodiment of the present application, the sending module 620 is further configured to send a third message including identification information and attribute information of the CF node to each SFF node, so that each SFF node identifies the CF node.

Optionally, in this embodiment of the present application, a protocol used for each of the first message, the second message, and the third message is the Intermediate System to Intermediate System IS-IS protocol or the Open Shortest Path First OSPF protocol.

Therefore, in this embodiment of the present application, the SFC forwarding table is synchronized in a flood manner or a multicast manner. Compared with the prior art in which the SFC forwarding table is synchronized in a one-to-one delivery manner, in the method provided in the present application, efficiency of synchronizing the SFC forwarding table can be improved.

It should be understood that, the CF node 600 in this embodiment of the present application may be corresponding to the CF node in the service function chain SFC-based communication method in the embodiment of the present application, and the foregoing and other operations and/or functions of the modules in the CF node 600 are separately used to implement corresponding procedures of methods in FIG. 2 to FIG. 4. For brevity, details are not described herein again.

Figure 9:
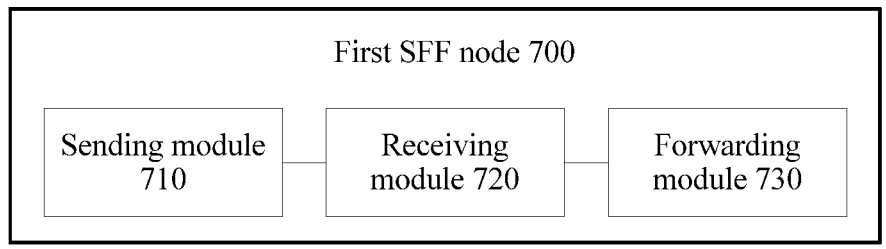
FIG. 9 is a schematic block diagram of an SFF node according to an embodiment of the present application.

FIG. 9 is a schematic block diagram of a service function chain SFC-based first service function forwarder SFF node 700 according to an embodiment of the present application. The SFC includes a classifier CF node, the first SFF node 700, and a first service function SF node. The first SFF node 700 is connected to the first SF node, and the first SFF node 700 includes:

a sending module 710, configured to send a first message to the CF node, where the first message includes identification information and attribute information of the first SFF node, and identification information and attribute information of the first SF node, so that the CF node obtains network topology information of the SFC based on the first message, where the network topology information of the SFC includes the identification information and the attribute information of the first SFF node 700, the identification information and the attribute information of the first SF node, and information used to indicate a connection relationship between the first SFF node 700 and the first SF node;

a receiving module 720, configured to receive, from the CF node, a second message used to indicate an SFC forwarding table, where the SFC forwarding table is obtained based on the network topology information of the SFC; and a forwarding module 730, configured to forward a data packet based on the SFC forwarding table received by the receiving module.

Therefore, in this embodiment of the present application, each SFF node in the SFC sends the first message including the identification information and the attribute information of the SFF node and the identification information and the attribute information of the SF node to the CF node, so that the CF node discovers a network topology of the SFC by using the first message. Compared with the prior art in which the network topology of the SFC is discovered through manual configuration, in the method provided in the present application, the network topology of the SFC can be flexibly and efficiently discovered, and costs can also be reduced.

It should be understood that the first SFF node 700 further includes a storage module, configured to store the network topology information of the SFC and the SFC forwarding table.

Optionally, in this embodiment of the present application, the sending module 710 is configured to send the first message to the CF node in a multicast manner.

Optionally, in this embodiment of the present application, the sending module 710 is configured to send the first message to the CF node in a flood manner.

Optionally, in this embodiment of the present application, a protocol used for the first message is the Intermediate System to Intermediate System IS-IS protocol or the Open Shortest Path First OSPF protocol, and the first message includes an SFF field used to indicate the identification information and the attribute information of the first SFF node, and an SF field used to indicate the identification information and the attribute information of the first SF node.

Optionally, in this embodiment of the present application, the receiving module 720 is configured to receive the second message from the CF node in a multicast manner.

Optionally, in this embodiment of the present application, the receiving module 720 is configured to receive the second message from the CF node in a flood manner.

Optionally, in this embodiment of the present application, an entry of the SFC forwarding table includes indication information used to indicate a service function path, and the indication information includes the identification information of the first SFF node and at least one of the identification information and the attribute information of the first SF node.

Optionally, in this embodiment of the present application, a protocol used for the second message is the IS-IS protocol or the OSPF protocol.

Optionally, in this embodiment of the present application, the receiving module 720 is further configured to receive, in a multicast manner or a flood manner, a third message including identification information and attribute information of the CF node from the CF node, where a protocol used for the third message is the IS-IS protocol or the OSPF protocol, and the third message includes a CF field used to indicate the identification information and the attribute information of the CF node.

Optionally, in this embodiment of the present application, the receiving module 720 is further configured to receive a fourth message from a second SFF node in the SFC in a flood manner or a multicast manner, where the fourth message includes identification information and attribute information of the second SFF node, and identification information and attribute information of a second SF node that has a connection relationship with the second SFF node.

The first SFF node 700 further includes:

an obtaining module 740, configured to obtain the network topology information of the SFC based on the fourth message received by the receiving module.

The sending module 710 is further configured to send the first message to the second SFF node in a flood manner or a multicast manner, so that the second SFF node obtains the network topology information of the SFC based on the first message.

A protocol used for each of the fourth message and the first message is the IS-IS protocol or the OSPF protocol. The fourth message includes an SFF field used to indicate the identification information and the attribute information of the second SFF node, and an SF field used to indicate the identification information and the attribute information of the second SF node. The first message includes the SFF field used to indicate the identification information and the attribute information of the first SFF node, and the SF field used to indicate the identification information and the attribute information of the first SF node.

It should be understood that, the first SFF node 700 in this embodiment of the present application may be corresponding to the SFF node in the service function chain SFC-based communication method in the embodiment of the present application, and the foregoing and other operations and/or functions of the modules in the first SFF node 700 are separately used to implement corresponding procedures of methods in FIG. 2 to FIG. 4. For brevity, details are not described herein again.

Figure 10:
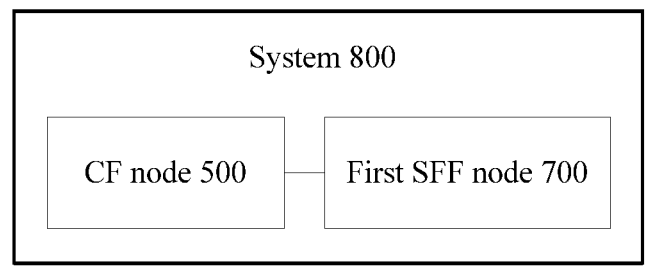
FIG. 10 is a schematic block diagram of an SFC-based system according to an embodiment of the present application.

FIG. 10 is a schematic block diagram of a service function chain SFC-based system 800 according to the present application. The system 800 includes the CF node 500 described in the foregoing embodiments and the first SFF node 700 described in the foregoing embodiments.

It should be understood that, the foregoing and other operations and/or functions of modules in the system are separately used to implement corresponding procedures of methods in FIG. 2 to FIG. 4. For brevity, details are not described herein again.

According to the SFC-based system provided in the present application, a network topology of the SFC can be flexibly and efficiently discovered, and costs can also be reduced.

Figure 11:
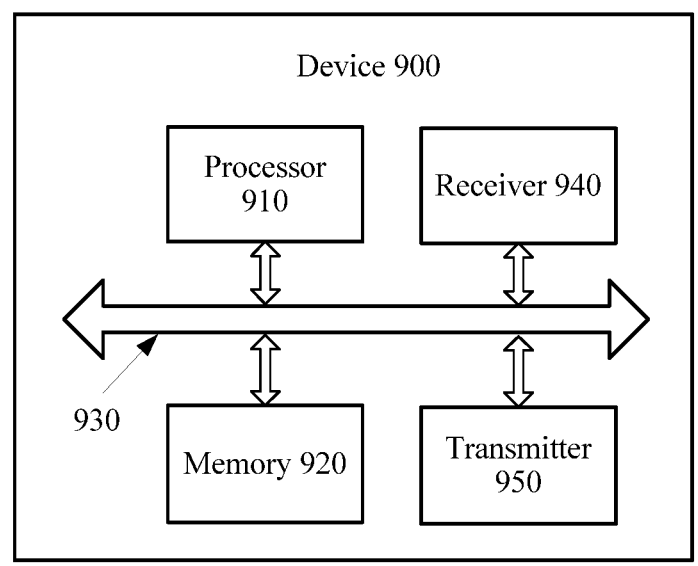
FIG. 11 is a schematic block diagram of a CF node according to another embodiment of the present application.

As shown in FIG. 11, an embodiment of the present application further provides a device 900. The device 900 is a classifier device 900 in a service function chain SFC. The SFC includes the device 900, a service function forwarder SFF node, and a service function SF node. The SFF node is connected to the SF node. The device 900 includes a processor 910, a memory 920, a bus system 930, a receiver 940, and a transmitter 950. The processor 910, the memory 920, the receiver 940, and the transmitter 950 are connected to each other by using the bus system 930. The memory 920 is configured to store an instruction. The processor 910 is configured to execute the instruction stored in the memory 920, to control the receiver 940 to receive a signal and control the transmitter 950 to send a signal. The receiver 940 is configured to receive a first message from the SFF node, where the first message includes identification information and attribute information of the SFF node, and identification information and attribute information of the SF node. The processor 910 is configured to: obtain network topology information of the SFC based on the first message, where the network topology information of the SFC includes the identification information and the attribute information of the SFF node, the identification information and the attribute information of the SF node, and information used to indicate a connection relationship between the SFF node and the SF node; and obtain an SFC forwarding table, where the SFC forwarding table is determined based on the network topology information of the SFC. The transmitter 950 is configured to send, to the SFF node, a second message used to indicate the SFC forwarding table, so that the SFF node forwards a data packet based on the SFC forwarding table.

In this embodiment of the present application, the device 900 receives a message that is sent by each SFF node in the SFC and that includes the identification information and the attribute information of the SFF node and the identification information and the attribute information of the SF node, to discover a network topology of the SFC. Compared with the prior art in which the network topology of the SFC is discovered through manual configuration, in the method provided in the present application, the network topology of the SFC can be flexibly and efficiently discovered, and costs can also be reduced.

Optionally, in this embodiment of the present application, the receiver 940 is configured to receive the first message from the SFF node in a multicast manner or a flood manner.

The device 900 receives the first message from the SFF node in a flood manner.

Optionally, in this embodiment of the present application, a protocol used for the first message is the Intermediate System to Intermediate System IS-IS protocol or the Open Shortest Path First OSPF protocol, and the first message includes an SFF field used to indicate the identification information and the attribute information of the SFF node, and an SF field used to indicate the identification information and the attribute information of the SF node.

Optionally, in this embodiment of the present application, the transmitter 950 is configured to send the second message to the SFF node in a multicast manner or a flood manner.

Optionally, in this embodiment of the present application, an entry of the SFC forwarding table includes indication information used to indicate a service function path, and the indication information includes the identification information of the SFF node and at least one of the identification information and the attribute information of the SF node.

Optionally, in this embodiment of the present application, a protocol used for the second message is the IS-IS protocol or the OSPF protocol.

Optionally, in this embodiment of the present application, the transmitter 950 is configured to send, in a multicast manner or a flood manner, a third message including identification information and attribute information of the device 900 to the SFF node, where a protocol used for the third message is the IS-IS protocol or the OSPF protocol, and the third message includes a CF field used to indicate the identification information and the attribute information of the device 900.

It should be understood that, the device 900 in this embodiment of the present application may be corresponding to the CF node in the SFC-based method in the embodiment of the present application, and may be corresponding to the CF node 500 in the embodiment of the present application, and the foregoing and other operations and/or functions of the modules in the device 900 are separately used to implement corresponding procedures of methods in FIG. 1 to FIG. 6. For brevity, details are not described herein again.

Figure 12:
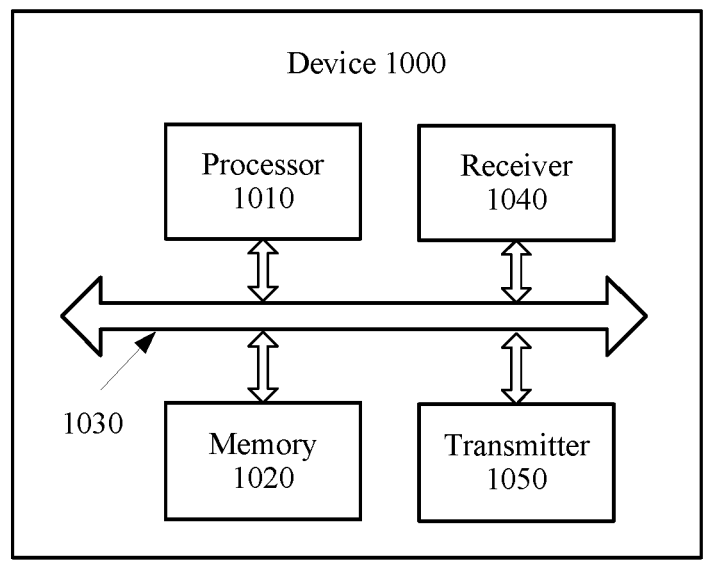
FIG. 12 is another schematic block diagram of a CF node according to another embodiment of the present application.

As shown in FIG. 12, an embodiment of the present application further provides a device 1000. The device is a classifier device 1000 in an SFC. The SFC includes the device 1000, a service function forwarder SFF node, and a service function SF node. The SFF node is connected to the SF node. The device 1000 includes a processor 1010, a memory 1020, a bus system 1030, a receiver 1040, and a transmitter 1050. The processor 1010, the memory 1020, the receiver 1040, and the transmitter 1050 are connected to each other by using the bus system 1030. The memory 1020 is configured to store an instruction. The processor 1010 is configured to execute the instruction stored in the memory 1020, to control the receiver 1040 to receive a signal and control the transmitter 1050 to send a signal. The processor 1010 is configured to: obtain network topology information of the SFC, where the network topology information of the SFC includes identification information and attribute information of the SFF node, identification information and attribute information of the SF node, and information used to indicate a connection relationship between the SFF node and the SF node; and obtain an SFC forwarding table, where the SFC forwarding table is determined based on the network topology information of the SFC. The transmitter 1050 is configured to send, to the SFF node in a flood manner or a multicast manner, a second message used to indicate the SFC forwarding table, so that the SFF node forwards a data packet based on the SFC forwarding table.

Therefore, in this embodiment of the present application, the SFC forwarding table is synchronized in a flood manner or a multicast manner. Compared with the prior art in which each node in the SFC needs to support the southbound interface protocol when the SFC forwarding table is delivered to the node in the SFC by using the southbound interface protocol, in the method in the present application, operability of synchronizing the SFC forwarding table can be effectively improved, and efficiency of synchronizing the SFC forwarding table can also be improved.

It should be understood that, the device 1000 in this embodiment of the present application may be corresponding to the CF node in the SFC-based method in the embodiment of the present application, and may be corresponding to the CF node 600 in the embodiment of the present application, and the foregoing and other operations and/or functions of the modules in the device 1000 are separately used to implement corresponding procedures of methods in FIG. 1 to FIG. 6. For brevity, details are not described herein again.

Figure 13:
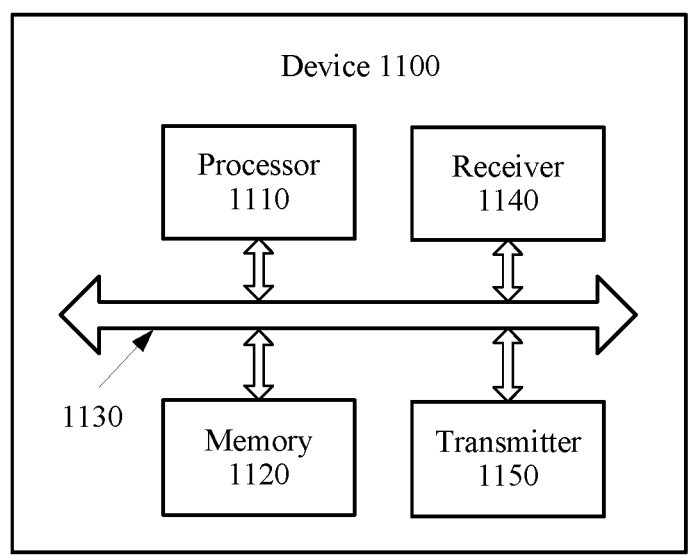
FIG. 13 is a schematic block diagram of an SFF node according to another embodiment of the present application.

As shown in FIG. 13, an embodiment of the present application further provides a device 1100. The device is an SFF node in an SFC. The SFC includes a classifier CF node, the device 1100, and a first service function SF node. The device 1100 is connected to the first SF node. The device 1100 includes a processor 1110, a memory 1120, a bus system 1130, a receiver 1140, and a transmitter 1150. The processor 1110, the memory 1120, the receiver 1140, and the transmitter 1150 are connected to each other by using the bus system 1130. The memory 1120 is configured to store an instruction. The processor 1110 is configured to execute the instruction stored in the memory 1120, to control the receiver 1140 to receive a signal and control the transmitter 1150 to send a signal. The transmitter 1150 is configured to send a first message to the CF node, where the first message includes identification information and attribute information of the device 1100, and identification information and attribute information of the first SF node, so that the CF node obtains network topology information of the SFC based on the first message, where the network topology information of the SFC includes the identification information and the attribute information of the device 1100, the identification information and the attribute information of the first SF node, and information used to indicate a connection relationship between the device 1100 and the first SF node. The receiver 1140 is configured to receive, from the CF node, a second message used to indicate an SFC forwarding table, where the SFC forwarding table is determined based on the network topology information of the SFC. The processor 1110 is configured to forward a data packet based on the SFC forwarding table.

Therefore, in this embodiment of the present application, each SFF node in the SFC sends the first message including the identification information and the attribute information of the SFF node and the identification information and the attribute information of the SF node to the CF node, so that the CF node discovers a network topology of the SFC by using the first message. Compared with the prior art in which the network topology of the SFC is discovered through manual configuration, in the method provided in the present application, the network topology of the SFC can be flexibly and efficiently discovered, and costs can also be reduced.

Optionally, in this embodiment of the present application, the transmitter 1050 is configured to send the first message to the CF node in a multicast manner or a flood manner.

Optionally, in this embodiment of the present application, a protocol used for the first message is the Intermediate System to Intermediate System IS-IS protocol or the Open Shortest Path First OSPF protocol, and the first message includes an SFF field used to indicate the identification information and the attribute information of the device 1100, and an SF field used to indicate the identification information and the attribute information of the first SF node.

Optionally, in this embodiment of the present application, the receiver 1140 is configured to receive the second message from the CF node in a multicast manner or a flood manner.

Optionally, in this embodiment of the present application, an entry of the SFC forwarding table includes indication information used to indicate a service function path, and the indication information includes the identification information of the device 1100 and at least one of the identification information and the attribute information of the first SF node.

Optionally, in this embodiment of the present application, a protocol used for the second message is the IS-IS protocol or the OSPF protocol.

Optionally, in this embodiment of the present application, the receiver 1140 is configured to receive, in a multicast manner or a flood manner, a third message including identification information and attribute information of the CF node from the CF node, where a protocol used for the third message is the IS-IS protocol or the OSPF protocol, and the third message includes a CF field used to indicate the identification information and the attribute information of the CF node.

Optionally, in this embodiment of the present application, the receiver 1140 is configured to receive a fourth message from a second SFF node in the SFC in a flood manner or a multicast manner, where the fourth message includes identification information and attribute information of the second SFF node, and identification information and attribute information of a second SF node that has a connection relationship with the second SFF node. The device 1100 and the second SFF node are different SFF nodes.

The processor 1110 is configured to obtain the network topology information of the SFC based on the fourth message.

The transmitter 1150 is configured to send the first message to the second SFF node in a flood manner or a multicast manner, so that the second SFF node obtains the network topology information of the SFC based on the first message.

A protocol used for each of the fourth message and the first message is the IS-IS protocol or the OSPF protocol. The fourth message includes an SFF field used to indicate the identification information and the attribute information of the second SFF node, and an SF field used to indicate the identification information and the attribute information of the second SF node. The first message includes the SFF field used to indicate the identification information and the attribute information of the device 1100, and the SF field used to indicate the identification information and the attribute information of the first SF node.

It should be understood that, the device 1100 in this embodiment of the present application may be corresponding to the SFF node in the SFC-based method in the embodiment of the present application, and may be corresponding to the first SFF node 700 in the embodiment of the present application, and the foregoing and other operations and/or functions of the modules in the device 1100 are separately used to implement corresponding procedures of methods in FIG. 1 to FIG. 6. For brevity, details are not described herein again.

It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A service function chain (SFC) based communication method, the method comprising:
   receiving, by a control node, a first message from a service function forwarder (SFF) node, wherein the first message comprises identification information of the SFF node, and identification information and attribute information of a service function (SF) node, the attribute information of the SF node for indicating a specific service function that can be implemented by the SF node;
   obtaining, by the control node, information of the SFC based on the first message, wherein the information of the SFC comprises the identification information of the SFF node, the identification information and the attribute information of the SF node, and information used to indicate a connection relationship between the SFF node and the SF node;
   obtaining, by the control node, an SFC forwarding table, wherein the SFC forwarding table is determined based on the information of the SFC; and
   sending, by the control node to the SFF node, a second message, wherein the second message comprises the SFC forwarding table used by the SFF node to forward a data packet to the SF node for processing and to forward a processed data packet to a next hop SFF node of the SFF node based on the SFC forwarding table, and wherein the processed data packet is obtained by the SF node by processing the data packet.

2. The communication method according to claim 1, wherein the receiving, by the control node, a first message from the SFF node comprises:
   receiving, by the control node, the first message from the SFF node in a multicast manner.

3. The communication method according to claim 1, wherein the receiving, by the control node, a first message from the SFF node comprises:
   receiving, by the control node, the first message from the SFF node in a flood manner.

4. The communication method according to claim 1, wherein a protocol used for the first message is the Intermediate System to Intermediate System (IS-IS) protocol or the Open Shortest Path First (OSPF) protocol, and the first message comprises an SFF field used to indicate the identification information of the SFF node, and an SF field used to indicate the identification information and the attribute information of the SF node.

5. The communication method according to claim 1, wherein the sending, by the control node to the SFF node, a second message used to indicate the SFC forwarding table comprises:
   sending, by the control node, the second message to the SFF node in a multicast manner.

6. The communication method according to claim 1, wherein the sending, by the control node to the SFF node, a second message used to indicate the SFC forwarding table comprises:
   sending, by the control node, the second message to the SFF node in a flood manner.

7. The communication method according to claim 1, wherein an entry of the SFC forwarding table comprises indication information used to indicate a service function path, and the indication information comprises the identification information of the SFF node and at least one of the identification information or the attribute information of the SF node.

8. The communication method according to claim 7, wherein a protocol used for the second message is the IS-IS protocol or the OSPF protocol.

9. The communication method according to claim 1, wherein the communication method further comprises:
   sending, by the control node in a multicast manner or a flood manner, a third message comprising identification information and attribute information of the control node to the SFF node, wherein a protocol used for the third message is the IS-IS protocol or the OSPF protocol, and the third message comprises a control field used to indicate the identification information and the attribute information of the control node.

10. A service function chain (SFC) based communication method, the method comprising:
    sending, by a first service function forwarder (SFF) node, a first message to the control node, wherein the first message comprises identification information of the first SFF node, and identification information and attribute information of a first service function (SF) node, wherein the first message is used to indicate the control node to obtain information of the SFC based on the first message, wherein the information of the SFC comprises the identification information of the first SFF node, the identification information and the attribute information of the first SF node, and information used to indicate a connection relationship between the first SFF node and the first SF node, the attribute information of the first SF node for indicating a specific service function that can be implemented by the first SF node;
    receiving, by the first SFF node from the control node, a second message, wherein the second message comprises an SFC forwarding table, wherein the SFC forwarding table is determined based on the information of the SFC; and
    forwarding, by the first SFF node, a data packet to the first SF node for processing based on the SFC forwarding table, and forwarding, by the first SFF node, a processed data packet to a next hop SFF node of the first SFF node based on the SFC forwarding table, wherein the processed data packet is obtained by the first SF node by processing the data packet.

11. The communication method according to claim 10, wherein the sending, by the first SFF node, a first message to the control node comprises:
    sending, by the first SFF node, the first message to the control node in a multicast manner.

12. The communication method according to claim 10, wherein the sending, by the first SFF node, a first message to the control node comprises:
   sending, by the first SFF node, the first message to the control node in a flood manner.

13. The communication method according to claim 10, wherein the receiving, by the first SFF node from the control node, a second message used to indicate an SFC forwarding table comprises:
   receiving, by the first SFF node, the second message from the control node in a multicast manner.

14. The communication method according to claim 10, wherein the receiving, by the first SFF node from the control node, a second message used to indicate an SFC forwarding table comprises:
   receiving, by the first SFF node, the second message from the control node in a flood manner.

15. The communication method according to claim 10, wherein an entry of the SFC forwarding table comprises indication information used to indicate a service function path, and the indication information comprises the identification information of the first SFF node and at least one of the identification information and the attribute information of the first SF node.

16. The communication method according to claim 10, wherein the communication method further comprises:
   receiving, by the first SFF node in a multicast manner or a flood manner, a third message comprising identification information and attribute information of the control node from the control node, wherein a protocol used for the third message is the IS-IS protocol or the OSPF protocol, and the third message comprises a control field used to indicate the identification information and the attribute information of the control node.

17. The communication method according to claim 10, wherein the communication method further comprises:
   receiving, by the first SFF node, a fourth message from a second SFF node in the SFC in a flood manner or a multicast manner, wherein the fourth message comprises identification information of the second SFF node, and identification information and attribute information of a second SF node that has a connection relationship with the second SFF node, and the first SFF node and the second SFF node are different SFF nodes;
   obtaining, by the first SFF node, the information of the SFC based on the fourth message; and
   sending, by the first SFF node, the first message to the second SFF node in a flood manner or a multicast manner, so that the second SFF node obtains the information of the SFC based on the first message.

18. A control node in a service function chain (SFC), the control node comprises:
   a non-transitory memory storing instructions; and
   a processor coupled to the non-transitory memory;
      wherein the instructions, when executed by the processor, cause the control node to:
   receive a first message from a service function forwarder (SFF) node, wherein the first message comprises identification information of the SFF node, and identification information and attribute information of a service function (SF) node, the attribute information of the SF node for indicating a specific service function that can be implemented by the SF node;
   obtain information of the SFC based on the first message received by the control node, wherein the information of the SFC comprises the identification information of the SFF node, the identification information and the attribute information of the SF node, and information used to indicate a connection relationship between the SFF node and the SF node;
   obtain an SFC forwarding table, wherein the SFC forwarding table is determined based on the information of the SFC that is obtained by the control node; and
   to send, to the SFF node, a second message to the SFF node, wherein the second message comprises the SFC forwarding table used by the SFF node to forward a data packet to the SF node for processing and to forward a processed data packet to a next hop SFF node of the SFF node based on the SFC forwarding table, and wherein the processed data packet is a obtained by the SF node by processing the data packet.

19. The control node according to claim 18, wherein the instructions, when executed by the processor, further cause the control node to receive the first message from the SFF node in a multicast manner.

20. The control node according to claim 18, wherein the instructions, when executed by the processor, further cause the control node to receive the first message from the SFF node in a flood manner.

21. The control node according to claim 18, wherein the instructions, when executed by the processor, further cause the control node to send the second message to the SFF node in a multicast manner.

22. The control node according to claim 18, wherein the instructions, when executed by the processor, further cause the control node to send the second message to the SFF node in a flood manner.

23. The control node according to claim 18, wherein an entry of the SFC forwarding table comprises indication information used to indicate a service function path, and the indication information comprises the identification information of the SFF node and at least one of the identification information and the attribute information of the SF node.

24. The control node according to claim 18, wherein the instructions, when executed by the processor, further cause the control node to send, in a multicast manner or a flood manner, a third message comprising identification information and attribute information of the control node to the SFF node, wherein a protocol used for the third message is the IS-IS protocol or the OSPF protocol, and the third message comprises a control field used to indicate the identification information and the attribute information of the control node.

25. A first service function forwarder (SFF) node in a service function chain (SFC), the first SFF node comprises:
   a non-transitory memory storing instructions; and
   a processor coupled to the non-transitory memory;
      wherein the instructions, when executed by the processor, cause a first service function forwarder (SFF) node to:
   send a first message to the control node, wherein the first message comprises identification information of the first SFF node, and identification information and attribute information of a first service function (SF) node, wherein the first message is used to indicate the control node to obtain information of the SFC based on the first message, wherein the information of the SFC comprises the identification information of the first SFF node, the identification information and the attribute information of the first SF node, and information used to indicate a connection relationship between the first SFF node and the first SF node the attribute information of the first SF node for indicating a specific service function that can be implemented by the first SF node;

receive, from the control node, a second message, wherein the second message comprises an SFC forwarding table, wherein the SFC forwarding table is obtained based on the information of the SFC; and forward a data packet to the first SF node for processing based on the SFC forwarding table received by the first SFF node and forward a processed data packet to a next hop SFF node of the first SFF node based on the SFC forwarding table received by the first SFF node, wherein the processed data packet is obtained by the first SF node by processing the data packet.

26. The first SFF node according to claim 25, wherein the instructions, when executed by the processor, further cause the first SFF node to send the first message to the control node in a multicast manner.

27. The first SFF node according to claim 25, wherein the instructions, when executed by the processor, further cause the first SFF node to send the first message to the control node in a flood manner.

28. The first SFF node according to claim 25, wherein an entry of the SFC forwarding table comprises indication information used to indicate a service function path, and the indication information comprises the identification information of the first SFF node and at least one of the identification information and the attribute information of the first SF node.

29. The first SFF node according to claim 25, wherein the instructions, when executed by the processor, further cause the first SFF node to receive, in a multicast manner or a flood manner, a third message comprising identification information and attribute information of the control node from the control node, wherein a protocol used for the third message is the IS-IS protocol or the OSPF protocol, and the third message comprises a control field used to indicate the identification information and the attribute information of the control node.

30. The first SFF node according to claim 25, wherein the instructions, when executed by the processor, further cause the first SFF node to:

receive a fourth message from a second SFF node in the SFC in a flood manner or a multicast manner, wherein the fourth message comprises identification information of the second SFF node, and identification information and attribute information of a second SF node that has a connection relationship with the second SFF node;

obtain the information of the SFC based on the fourth message received by the first SFF node, and send the first message to the second SFF node in a flood manner or a multicast manner, so that the second SFF node obtains the information of the SFC based on the first message.

* * * * *